FIG. 2

INVENTORS
CHARLES R. DAVIDSON JR and
WILLIAM P. MITCHELL
BY Oscar L. Spencer
ATTORNEY

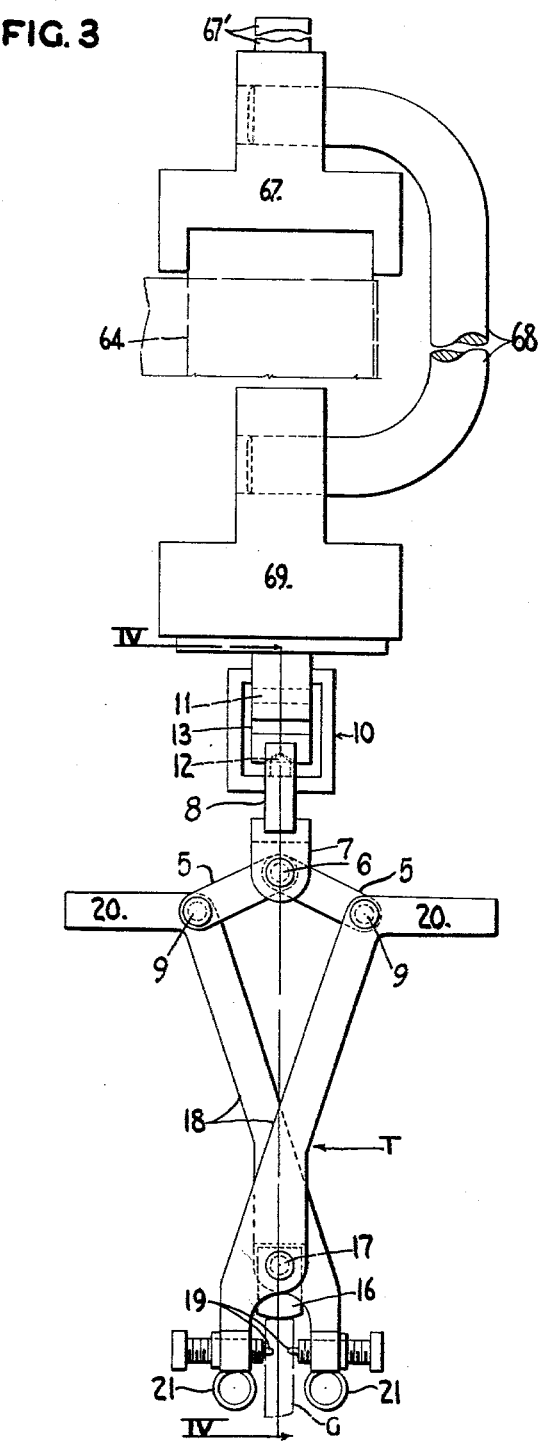

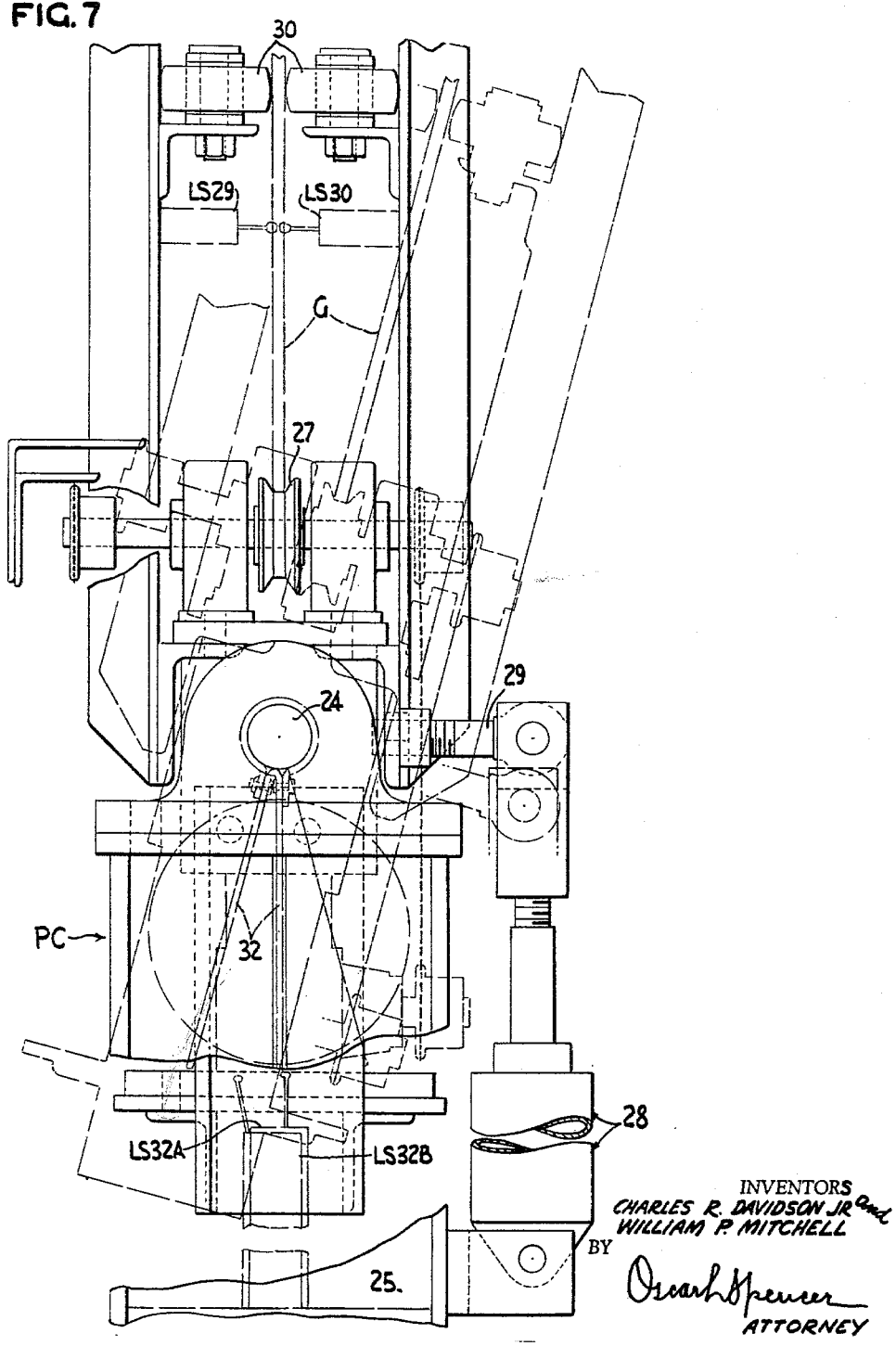

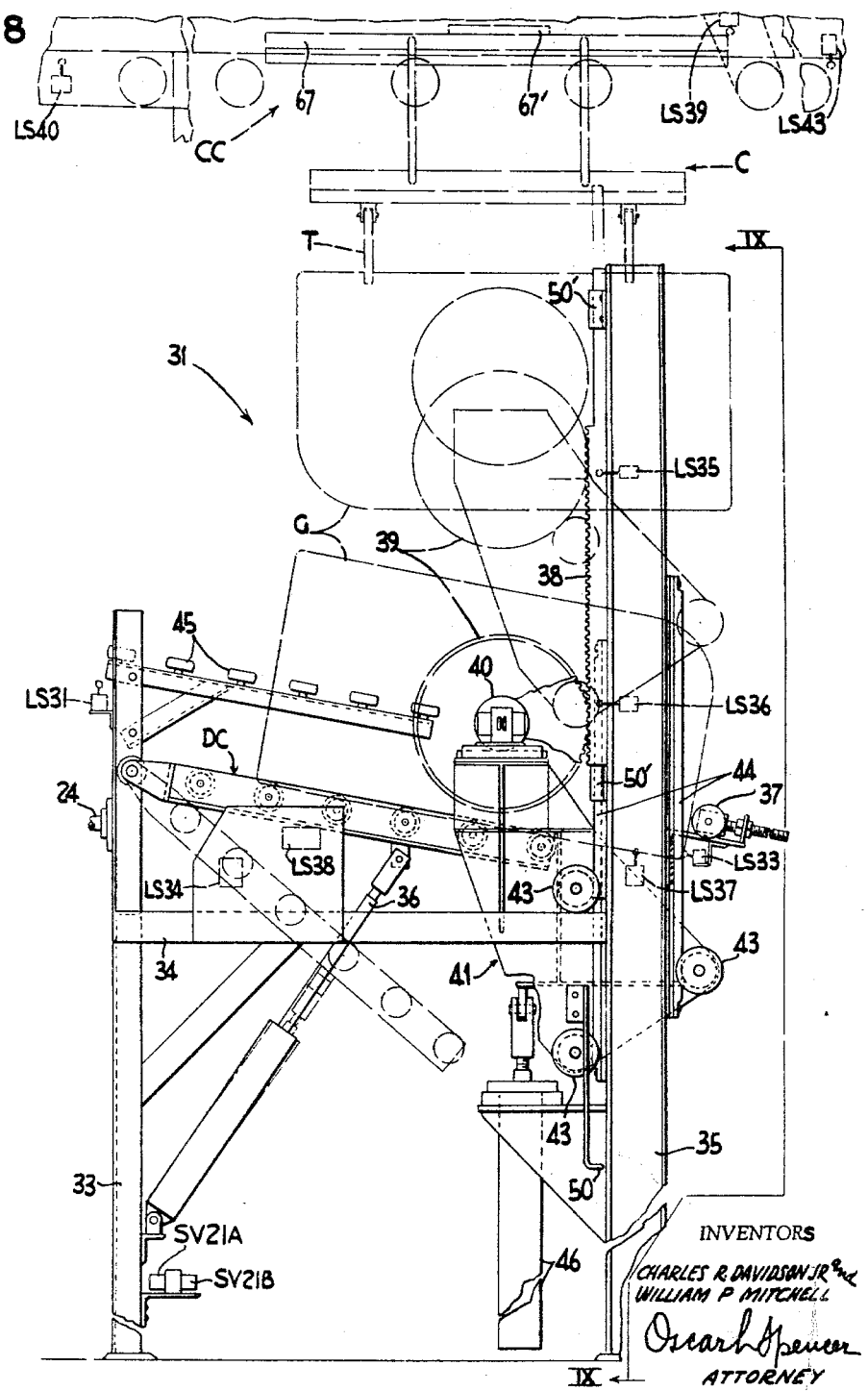

April 13, 1965    C. R. DAVIDSON, JR., ETAL    3,178,045
HANDLING RIGID SHEET ARTICLES
Original Filed April 16, 1959    14 Sheets-Sheet 6
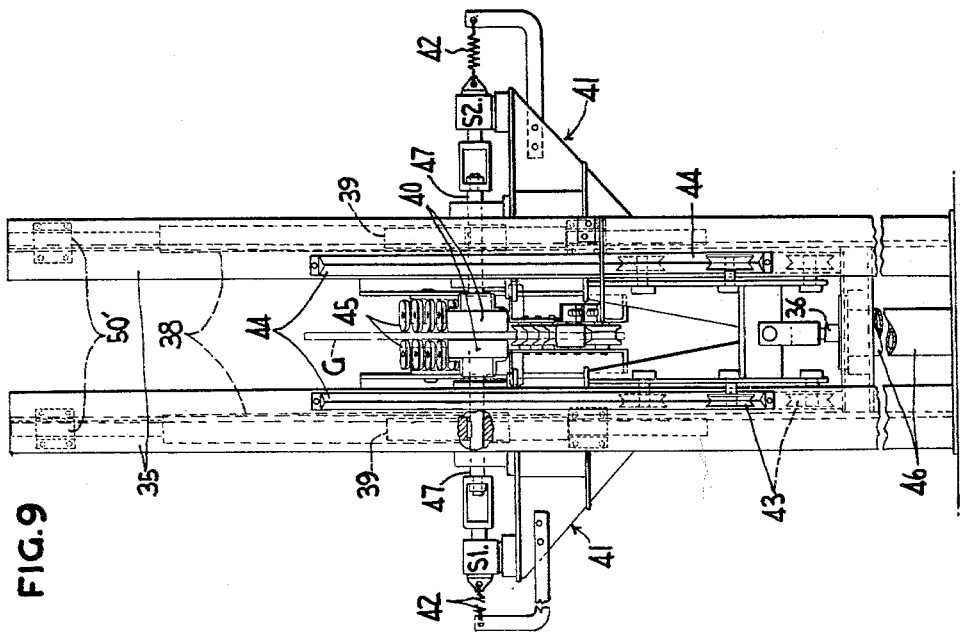
INVENTORS
CHARLES R. DAVIDSON JR
WILLIAM P. MITCHELL
Oscar L. Spencer
ATTORNEY April 13, 1965   C. R. DAVIDSON, JR., ETAL   3,178,045
HANDLING RIGID SHEET ARTICLES
Original Filed April 16, 1959   14 Sheets-Sheet 7

INVENTORS
CHARLES R. DAVIDSON JR and
WILLIAM P. MITCHELL
BY
ATTORNEY

April 13, 1965   C. R. DAVIDSON, JR., ETAL   3,178,045
HANDLING RIGID SHEET ARTICLES
Original Filed April 16, 1959   14 Sheets-Sheet 8
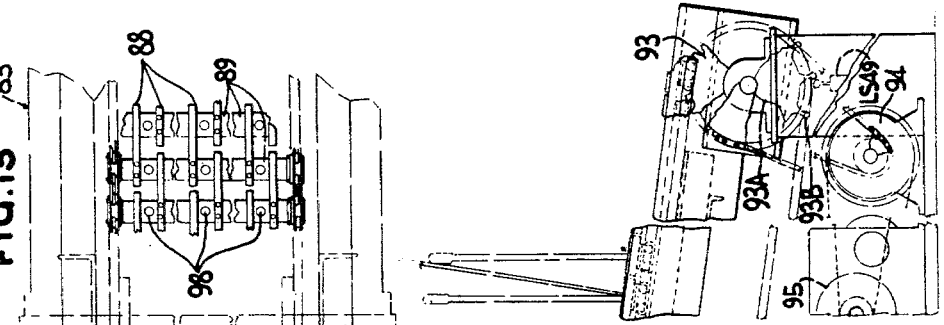
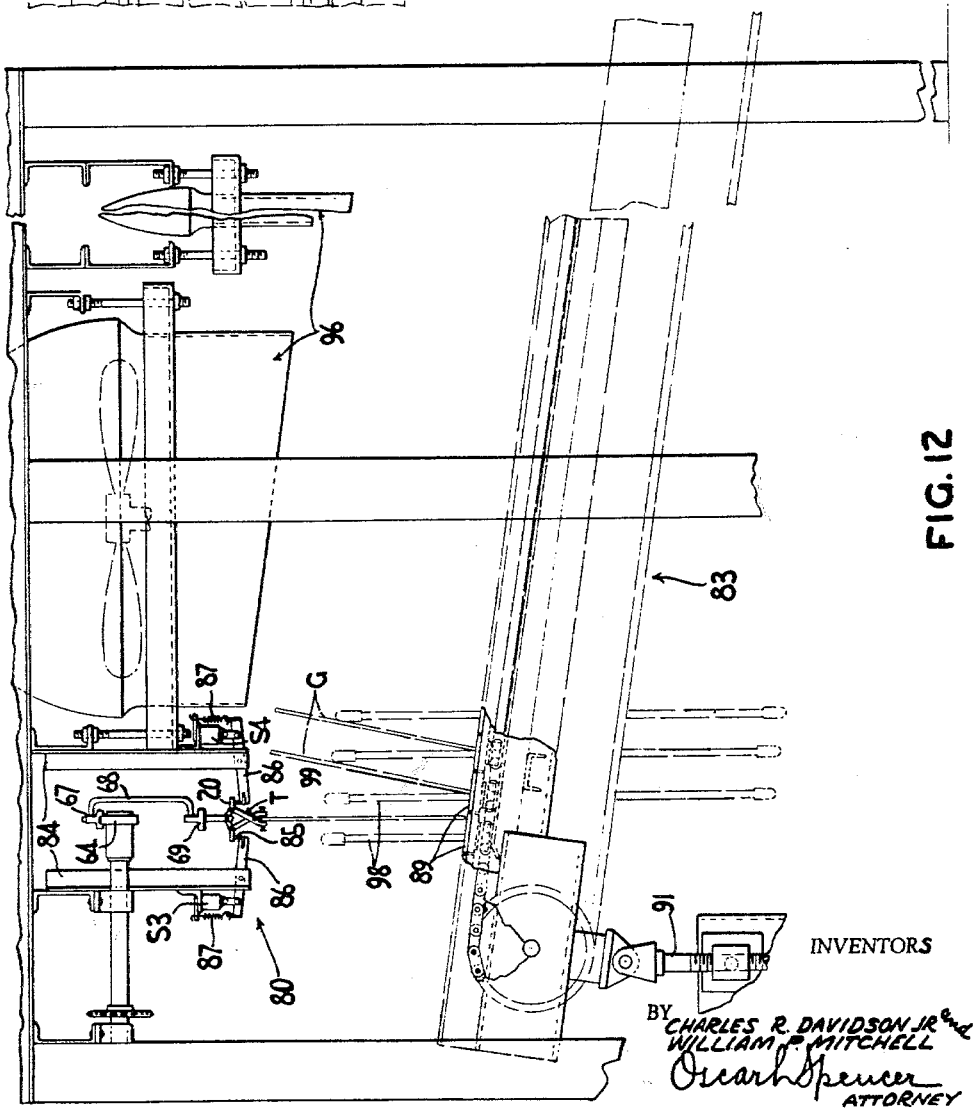
INVENTORS
BY *CHARLES R. DAVIDSON JR*
*WILLIAM P. MITCHELL*
*Oscar L. Spencer*
ATTORNEY

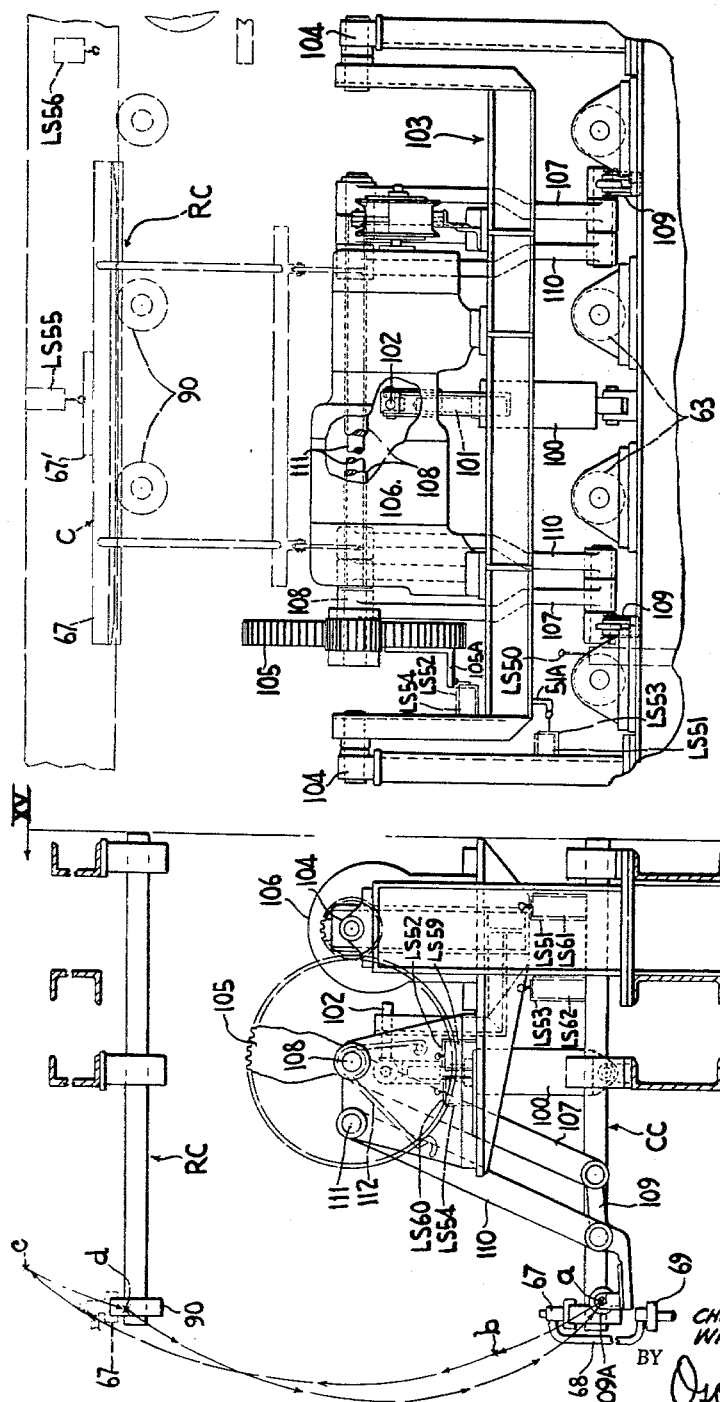

April 13, 1965　　C. R. DAVIDSON, JR., ETAL　　3,178,045
HANDLING RIGID SHEET ARTICLES
Original Filed April 16, 1959　　　　　　　　14 Sheets-Sheet 10

INVENTORS
CHARLES R. DAVIDSON JR &
BY WILLIAM P MITCHELL

Oscar L Spencer
ATTORNEY

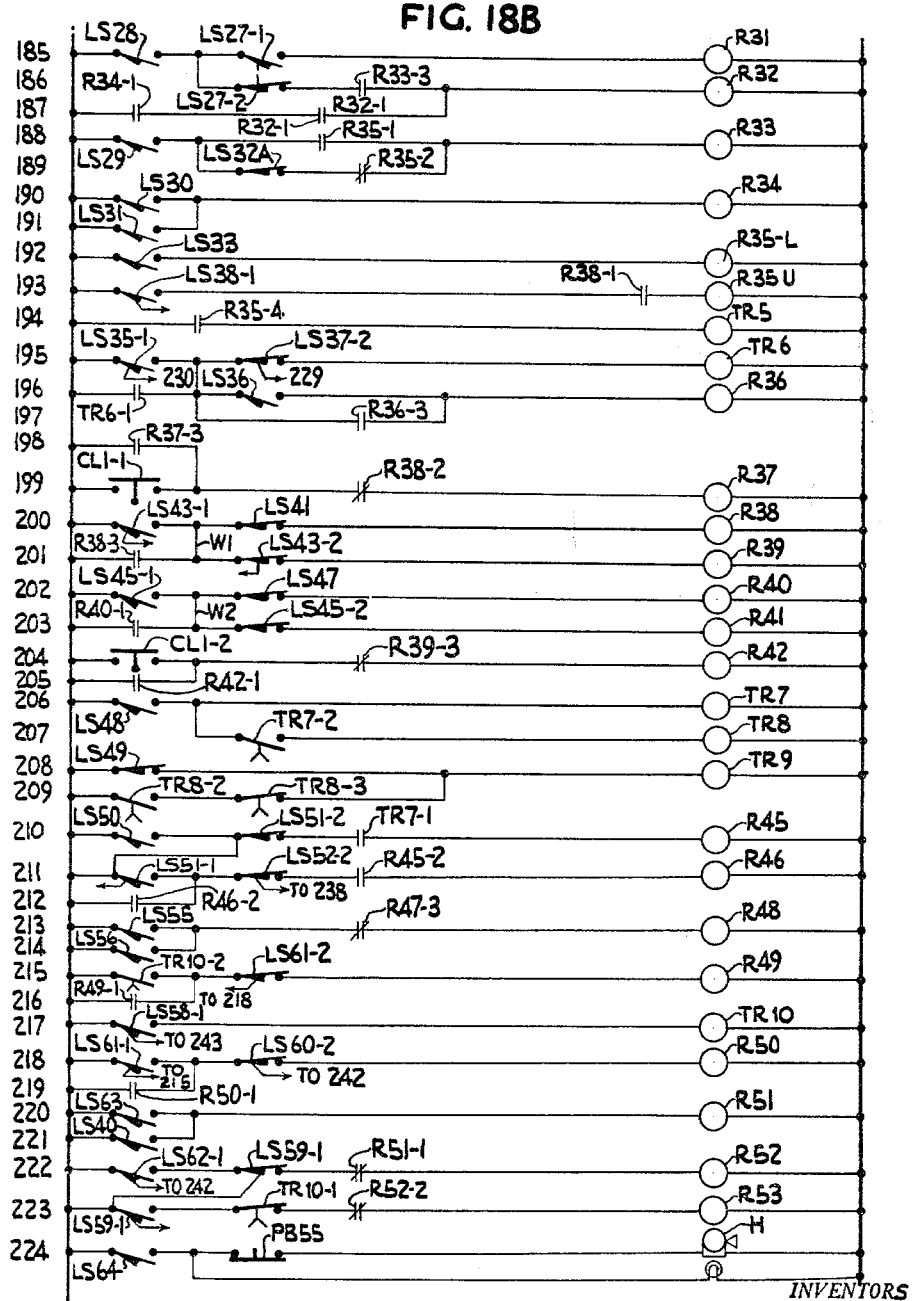

FIG. 18D

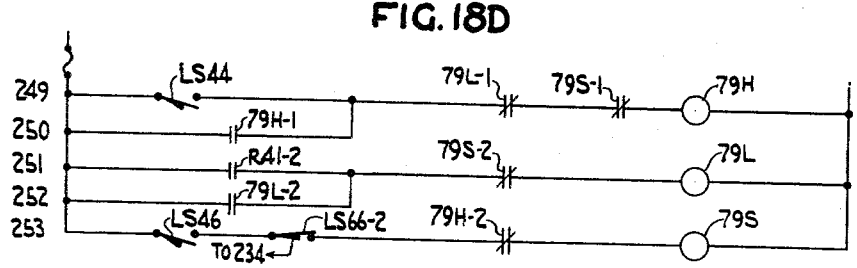

FIG. 18E

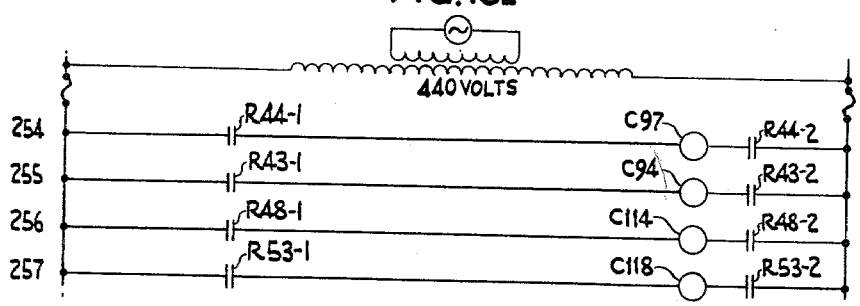

LEGEND OF SYMBOLS

| Symbol | Meaning |
|---|---|
| LS | NORMALLY OPEN LIMIT SWITCH |
| LS | NORMALLY CLOSED LIMIT SWITCH |
| PB | NORMALLY OPEN PUSHBUTTON SWITCH |
| PB | NORMALLY CLOSED PUSHBUTTON SWITCH |
| —⊩— | NORMALLY OPEN CONTACT |
| —⊬— | NORMALLY CLOSED CONTACT |
| | NORMALLY OPEN CONTACT~CLOSES AFTER TIME DELAY |
| | NORMALLY CLOSED CONTACT~OPENS AFTER TIME DELAY |
| CL | CAM LIMIT SWITCH |
| R | RELAY |
| C | MOTOR STARTING COIL |
| TR | TIME DELAY RELAY |
| ○ | SOLENOID VALVES |

FIG. 19

INVENTORS
CHARLES R. DAVIDSON JR &
WILLIAM P. MITCHELL
BY
Oscar L. Spencer
ATTORNEY 3,178,045
HANDLING RIGID SHEET ARTICLES
Charles R. Davidson, Jr., Natrona Heights, and William P. Mitchell, Brookline, Pa., assignors to Pittsburgh Plate Glass Company, Pittsburgh, Pa., a corporation of Pennsylvania
Original application Apr. 16, 1959, Ser. No. 806,956. Divided and this application Jan. 15, 1962, Ser. No. 166,183
9 Claims. (Cl. 214—89)

This application relates to handling rigid sheet articles, and, while it has applicability in automatically loading rigid sheet articles into tongs and then unloading the articles after they have been transferred, the present invention has special utility in the automatic handling of various sizes of glass sheets precut to desired outlines and previously washed and dried so that they may be tempered and/or coated without requiring handling by a human hand.

Previous to the present invention, it had been necessary to manually load glass sheets in tongs before conveying the glass sheets through a lehr, where the glass sheets are heated to a temperature sufficiently high for tempering by sudden chilling with air blasts or for forming metal oxide films by spraying suitable metal salt compositions, and then conveying the glass sheets through a quenching station where the heated glass sheets are suddenly chilled or through a spraying station where a suitable metal salt composition is sprayed onto the heated glass sheet surface. Also, prior to the present invention, glass sheets were removed manually from the grip imposed by the gripping tongs.

Many disadvantages are present in the former glass handling technique. First of all, manual loading unloading are quite expensive because of high labor costs. Secondly, manual handling causes shrinkage due to breakage. Thirdly, manual operations are not conducive to uniform treatment, a desideratum of mass production.

The present invention provides automatic handling of glass sheets that previously have been cut to outline, their edges abraded, their corners chamfered by steaming, and washed and dried. The benefits derived from the present invention will be understood better after studying the description of an illustrative embodiment of the invention which follows and which is made for the purpose of illustration rather than limitation. Reference to the latter may be obtained from studying the accompanying claims.

In the drawings forming part of the description of an illustrative embodiment.

FIG. 2 is a longitudinal, fragmentary elevation of another part of the illustrative embodiment of the present invention with emphasis on the automatic unloading station and with portions removed to enable illustrating the important elements of the entire apparatus in two assembly drawings in sufficient detail to permit its understanding.

FIG. 3 is an enlarged fragmentary elevation of a pair of tongs specially constructed for use in the present invention for gripping glass sheets and particularly useful to secure automatic loading and unloading. Parts of the carriage are removed to show the tongs in as large a scale as possible.

FIG. 4 is a fragmentary sectional view taken along the lines IV—IV of FIG. 3.

FIG. 5 is a view similar to FIG. 4 showing only a portion of the structure of FIG. 4 and illustrating how the tongs are locked in position while receiving a glass sheet.

FIG. 6 is a fragmentary end elevation of a loading conveyor taken along the lines VI—VI of FIG. 1.

FIG. 7 is a fragmentary sectional view of the pivotable conveyor section taken along the lines VII—VII of FIG. 1.

FIG. 8 is a longitudinal elevation of the glass loading station where glass sheets are automatically loaded into tongs.

FIG. 9 is a fragmentary end elevation of the glass loading station taken along lines IX—IX of FIG. 8 and omitting certain background structure to improve the clarity of the illustration.

FIG. 11 is a plan view of a quenching station where glass sheets are quenched after being heated in the furnace.

FIG. 12 is a fragmentary sectional view taken along the lines XII—XII of FIG. 2 and showing a fragmentary longitudinal elevation of a peg conveyor onto which glass sheets are deposited.

FIG. 13 is a fragmentary plan view of the peg conveyor.

FIG. 14 is an end elevation of a carriage lifting station where carriages are transferred to a return conveyor, taken along the lines XIV—XIV of FIG. 2.

FIG. 15 is an enlarged fragmentary view taken at right angles to that of FIG. 14 along lines XV—XV.

FIGS. 18A through 18E are schematic electrical circuit diagrams of the control circuits for the apparatus depicted in the previous drawings.

FIG. 19 is a legend of symbols used in the electrical circuit diagrams.

*General assembly*

Figure 1:
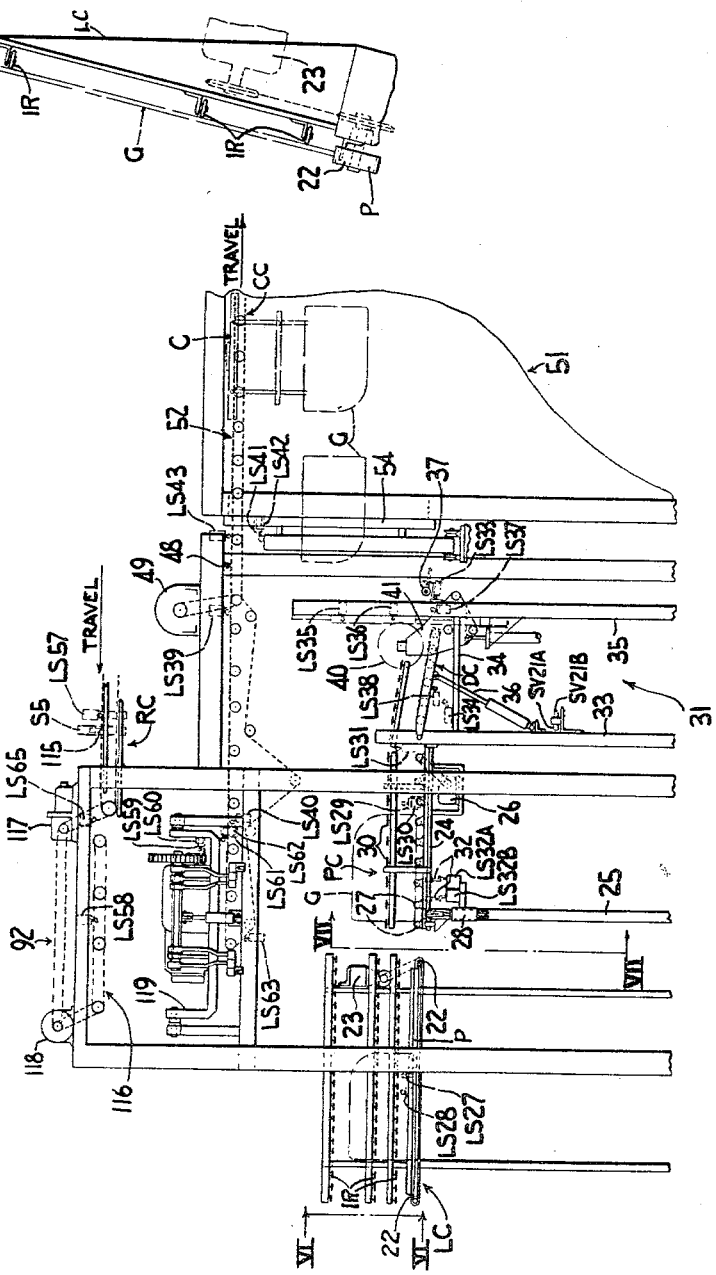
FIG. 1 is a fragmentary longitudinal elevation of part of an illustrative embodiment of the present invention with emphasis on the automatic loading station and with certain parts unessential to understand the novel aspects of the invention omitted for clarity.

Apparatus typifying the present invention utilizes a plurality of carriages C, (FIGURES 1, 2, 3, 8, 10, 12, and 14) each provided with at least one bracket member 10 fixed to the bottom thereof. The bracket members (FIGURE 3) each have an upper portion with a downwardly facing grooved surface 11 and a lower portion having an upwardly pointed member 12 of conical shape spaced below the grooved surface 11. A wedge shaped member 13 is constructed to have a pointed upper surface 14 and a conically grooved bottom surface 15, and arranged for vertical movement betwen an upper position wherein its upper pointed surface 14 locks into grooved surface 11 and a lowered position wherein its bottom conically recessed surface 15 pivots freely about pointed member 12. This free pivoting is possible because the conical recess of surface 15 has a larger apex angle than that of pointed member 12.

A pair of tongs T are pivoted with respect to each wedge-shaped member 13 and hang down therefrom. The tongs T include a stop member 16 pivoted to a common hinge pin 17 for the tong arms 18. The latter, in turn, are apertured near their bottom to receive opposed tong points 19 which are adapted to grip a glass sheet G therebetween, while additional extension arms 20 extend horizontally outwardly of the upper extremities of the tong arms 18 to facilitate unloading as will be explained in greater detail later. Guide members 21, which insure that the glass is properly oriented into the tongs T on loading, are attached to the bottom of the tong arms 18. Tongs T also include a pair of upper links 5 pivoted to one another at their upper portions through a common link pin 6 carried by a clevis 7. The latter is rigidly attached to the wedge shaped member 13 through connector plates 8. Additional pins 9 serve to pivotally connect the bottom portion of one of the upper links 5 to the upper portion of one of the tong arms 18 and the bottom portion of the other upper portion of the other tong arm 18.

Referring especially to FIGURES 1 and 2, an illustrative embodiment of the present invention comprises a conveyor extending along a longitudinal axis thereof and including in end-to-end relation along its length a first or loading conveyor LC, a pivotable conveyor section PC extending beyond the first or loading conveyor LC, and a downwardly slanted conveyor section DC. The first conveyor section LC extends from a cleaning station (not shown) and is constructed to convey clean glass sheets at an angle of 15 degrees to the vertical (FIGURE 6). The loading conveyor section LC comprises a pulley P extending between rolls 22. The pulley P is driven by a motor 23. The loading conveyor LC contains limit switches LS27 and LS28 positioned for actuation by a glass sheet. The loading conveyor LC also includes idler rolls IR which support the bottom major surface of the glass sheets G while their bottom edge rests on pulley P.

The pivotable conveyor section PC is pivoted about a horizontal axis defined by a longitudinally extending pivot rod 24 (FIGURES 1 and 7) between an oblique plane aligned with the plane of glass support provided by the loading conveyor section LC and a vertical plane. Pivot rod 24 extends in a direction parallel to the longitudinal axis of the conveyor between support columns 25 and 33. Pivot rod 24 carries support structure for a pivotable conveyor drive motor 26 as well as structure supporting drive rolls 27. A piston and cylinder actuator 28 is pivoted between support column 25 and an arm 29 (FIGURE 7) rigidly attached to the pivotable conveyor section PC to cause pivotable conveyor section PC to pivot about an axis of rotation defined by the pivot rod 24. Free running rolls 30 are carried by the pivotable conveyor section PC to balance a glass sheet in the interval between its removal from the loading conveyor section LC and its arrival at a loading station 31.

The pivotable conveyor section PC carries limit switches LS29, LS30, and LS31, which are positioned for actuation by the leading edge of a glass sheet on the pivotable conveyor section PC. Other limit switches LS32A and LS32B are mounted on column 25 and are angularly offset with respect to each other by 15 degrees. Fingers 32 extend downwardly from the pivotable conveyor section PC so that they actuate the limit switches LS32A and LS32B upon rotation of the pivotable conveyor section PC between a vertical and an oblique position.

The loading station 31 (FIGURES 1, 8, and 9) comprises the downwardly slanted conveyor section DC pivotable in a vertical plane. Conveyor section DC receives a glass sheet from the pivotable conveyor section PC when the pivotable conveyor section PC is tilted into alignment with the downwardly slanted conveyor section DC in a common vertical plane. Downwardly inclined conveyor section DC is pivoted in cantilever fashion between the vertical columns 33 of an open support structure, which includes horizontally extending beams 34 interconnecting columns 33 with vertical columns 35. One of the vertical columns 33 also pivotally carries a piston cylinder whose piston rod 36 is pivoted at its free extremity to the downwardly slanted conveyor section DC. The latter ends at a bumper wheel 37. Each column 35 of the open support structure supports a vertically extending rack 38.

Pinion gears 39 mesh with racks 38 and are also keyed to axially aligned sectional shafts 47 which rigidly support opposed gripper members 40 at their inboard extremities. The sectional shafts 47 are mounted in sliding and rotatable relation in bearings forming part of the hoist structure 41.

Gripper members 40 are axially movable relative to pinion gears 39 in response to axial movement of sectional shafts 47. The gripper members are made of a suitable glass facing material such as soft neoprene or rubber that does not mar glass.

Solenoids S1 and S2 are attached to the longitudinal extremities of sectional shafts 47 removed from gripper members 40. Springs 42 are connected from the solenoids S1 and S2 to a part fixed to the hoist 41 to urge gripper members 40 from each other normally. The action of the springs 42 is counteracted by the solenoids S1 and S2, the details of which will be described later. The hoist 41 also includes wheels 43 which ride on tracks 44 fixed to the columns 35. Hoist 41 serves as support means for shafts 47.

Guide wheels 45 are supported in freely rotatable relation to oblique supports disposed above downwardly slanted conveyor section DC to help support glass sheets in a vertical plane. The guide wheels 45 and their support terminate short of the gripper members 40, to permit the latter to move vertically while gripping a flat sheet therebetween. A piston 46 actuates movement of the hoist 41 in a vertical path defined by the tracks 44.

Suitable control circuits and indexing means, which will be explained in detail below, control the sequence of operations of the various structural elements in this portion of the apparatus. Circuit details and operation will be described in greater detail below.

The control circuits which coordinate glass movements from downwardly slanting conveyor section DC to gripping engagement by tongs T are actuated by limit switches LS33, LS34, LS35, LS36, LS37, and LS38. Limit switch LS33 is located in alignment with the plane of the glass sheets when downwardly slanted conveyor section DC is in its uppermost position and the sheets are supported by guide rolls 45. Limit switch LS34 is positioned in the path of pivoting of the downwardly slanted conveyor section DC. Limit switches LS35, LS36, and LS37 are mounted to one of the vertical columns 35 in the path of movement of the hoist 41 and are constructed and arranged for actuation by the hoist at the uppermost limit of the hoist movement, at a point intermediate the downward movement of the hoist and at the lowermost point of hoist movement, respectively. Limit switch LS38 is positioned for actuation by the downwardly slanting conveyor section DC when the latter is pivoted upwardly. Limit switches LS34 and LS38 are fixed to a bracket supported by one of the beams 34.

In order to insure that a straight edge of the glass sheet is disposed horizontally when the glass enters the tongs, the racks 38 and pinions 39 are so constructed that the pinion rotates slightly less than 180 degrees, thereby rotating the glass sheet from a slightly downwardly inclined position into such position that the upper edge of the glass sheet occupies a horizontal line while the glass is still below its points of entry into the tongs. At this point, a hook 50 attached to the hoist 41 engages the bottom of the rack 38 and causes the latter to slide upwardly together with the remainder of the hoist structure without further rotating the pinion gear 39. Rack guides 50' are attached to column 35 to permit upward sliding of the rack 38 therethrough from its rest position on a stop.

Figure 10:
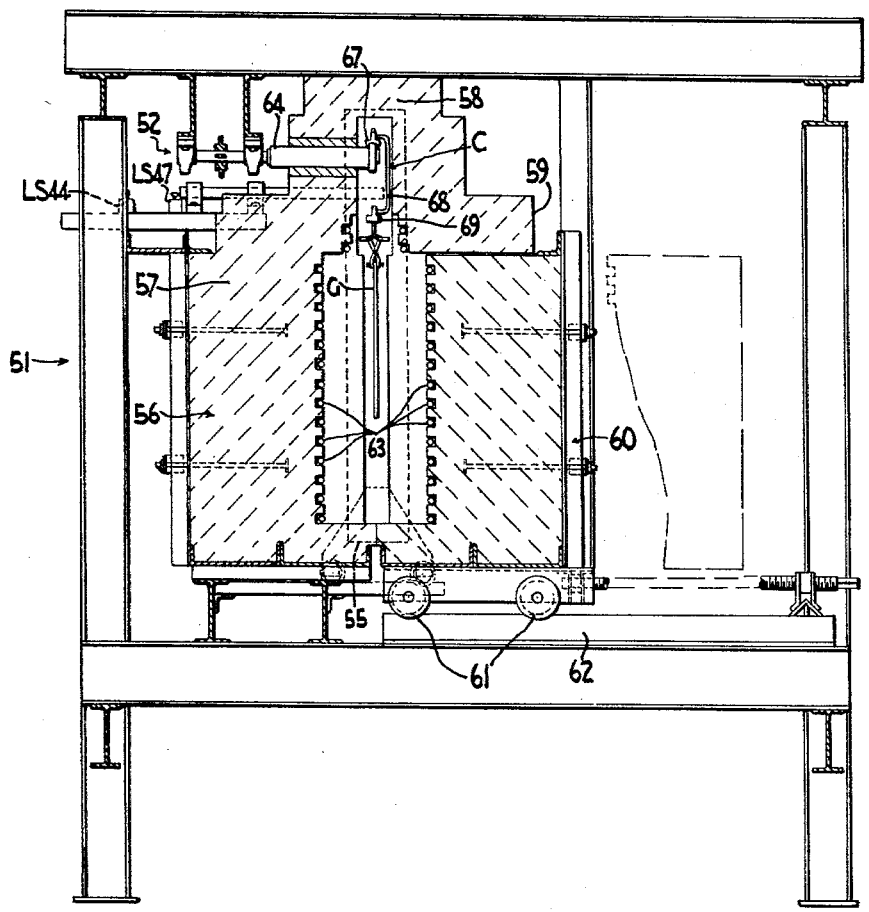
FIG. 10 is a sectional view across a heating furnace taken along the lines X—X of FIG. 2. The furnace is used to heat glass sheets gripped by tongs.

A carriage conveyor CC provides a path substantially parallel to that of the glass conveyor sections LC, PC, and DC and comprises a high speed run-in carriage conveyor section 48 intermittently driven by a motor 49 for conveying a carriage from the loading station 31 into a tunnel-like furnace 51. A motor 53 (FIGURES 2 and 16) conveys the carriages C through the furnace 51 along furnace section 52 of the carriage conveyor CC (FIGURES 1 and 10). The furnace also includes an entrance door 54 and an exit door 55.

Limit switches LS40, LS39, and LS43 are located along the path of carriage movement for actuation by a carriage C as the carriage occupies various positions along carriage conveyor CC at loading station 31 and immediately outside the entrance door 54. Limit switches LS41 and LS42 are actuated by the opening and closing of entrance door 54, respectively.

Furnace 51 comprises a plurality of interconnected furnace sections extending from the entrance door 54 to the exit door 55. As seen in the cross-sectional view of FIGURE 10, the furnace comprises a metal-reinforced refractory structure 56 that comprises one side wall 57, the roof 58, and part 59 of the other side wall of the furnace.

The remainder of the other side wall of the furnace is provided by a laterally displaceable metal-reinforced refractory structure 60 mounted on rollers 61 that travel along rails 62 extending laterally of the furnace. Sufficient structures 60 are provided along the length of furnace 51 to permit operating personnel to obtain access within the furnace for repair and maintenance work.

The inwardly facing walls of structures 56 and 60 support electrical heating elements 63, the thermal output of which is controlled by an individual control unit (not shown) for controlling the electrical power supplied to individual sets of heaters. The number and arrangement of heating circuits depends on the degree of control required for the radiant level longitudinally and transversely of the path of movement taken by the glass sheets through furnace 51.

Carriage conveyor CC comprises stub rolls 64, which are continuously driven by motor 53 through a chain drive 65. The drive system also includes overrunning clutches 66, the employment of which will be described later.

Each carriage C contains a superstructure 67 that rides on the conveyor rolls 64, a connector 68 of C-shaped construction and a bottom portion 69 which carries the tongs T. A lug or dog 67' is fixed to superstructure 67.

A positive instrument variable unit 70 contains cam limit switches CL1 and CL2. The latter are rotated continuously by motor 53 to periodically actuate other elements by means which will be described in greater detail later.

Limit switch LS66 is positioned along carriage conveyor CC for actuation by the carriages C within the furnace near exit door 55, while limit switch LS45 is located for actuation by the carriages C just beyond the furnace 51. Limit switches LS44 and LS47 are positioned for actuation by the opening and closing of exit door 55, respectively.

Beyond the exit door 55 of furnace 51 is the quenching station 71, where the heated glass sheets are cooled rapidly upon leaving the furnace. At the quenching station 71, opposed apertured blow boxes 72 are mounted on cams 73 and driven by motors 74 through suitable drive shafts and gearing so that the boxes 72 describe circular paths in planes parallel to the surfaces of the glass sheets held therebetween. A limit switch LS46 is located along the path defined by the carriage conveyor CC for actuation by an oncoming carriage C to stop the carriage between the opposed blow boxes 72.

A compressor fan 75 forces air under pressure through ductwork 76, including a flexible portion 77, into one of the blow boxes 72 so that air may be supplied under pressure through the nozzle orifices of the blow boxes 72. The other blow box 72 is similarly connected for circular orbital motion to driving means such as the cams 73, gearing, drive shafts and motor 74 and to another compressor fan 75 so that both surfaces of one or more glass sheets may be chilled equally rapidly at the quenching station 71. It is understood that a single driving means may be used to move both blow boxes and a single compressor may be used to supply quenching fluid under pressure to both blow boxes.

Figures 16, 17:
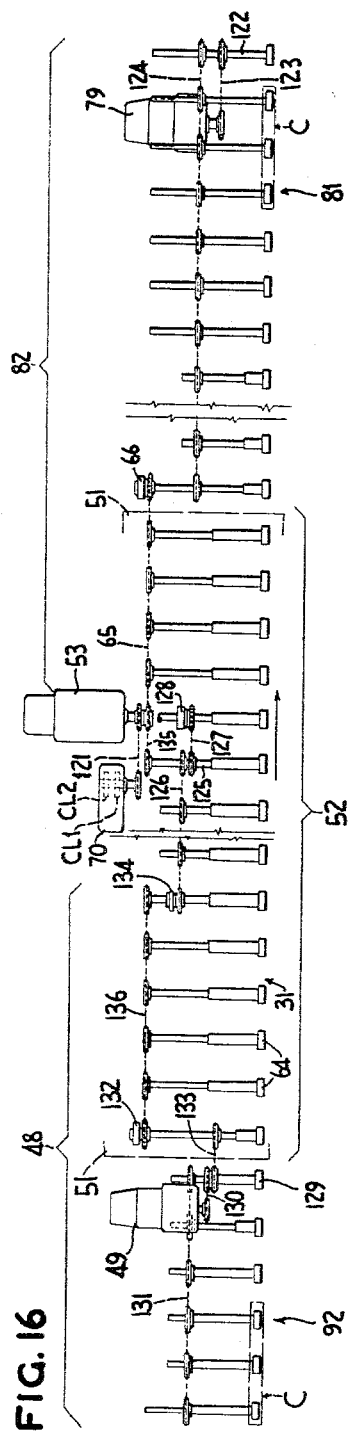
FIGURE 16 is fragmentary plan view of the system of drive mechanisms for forward movement of carriages and glass sheets.
FIG. 17 is a fragmentary plan view of the system of drive mechanisms for return movement of carriages.
Figure 18A:
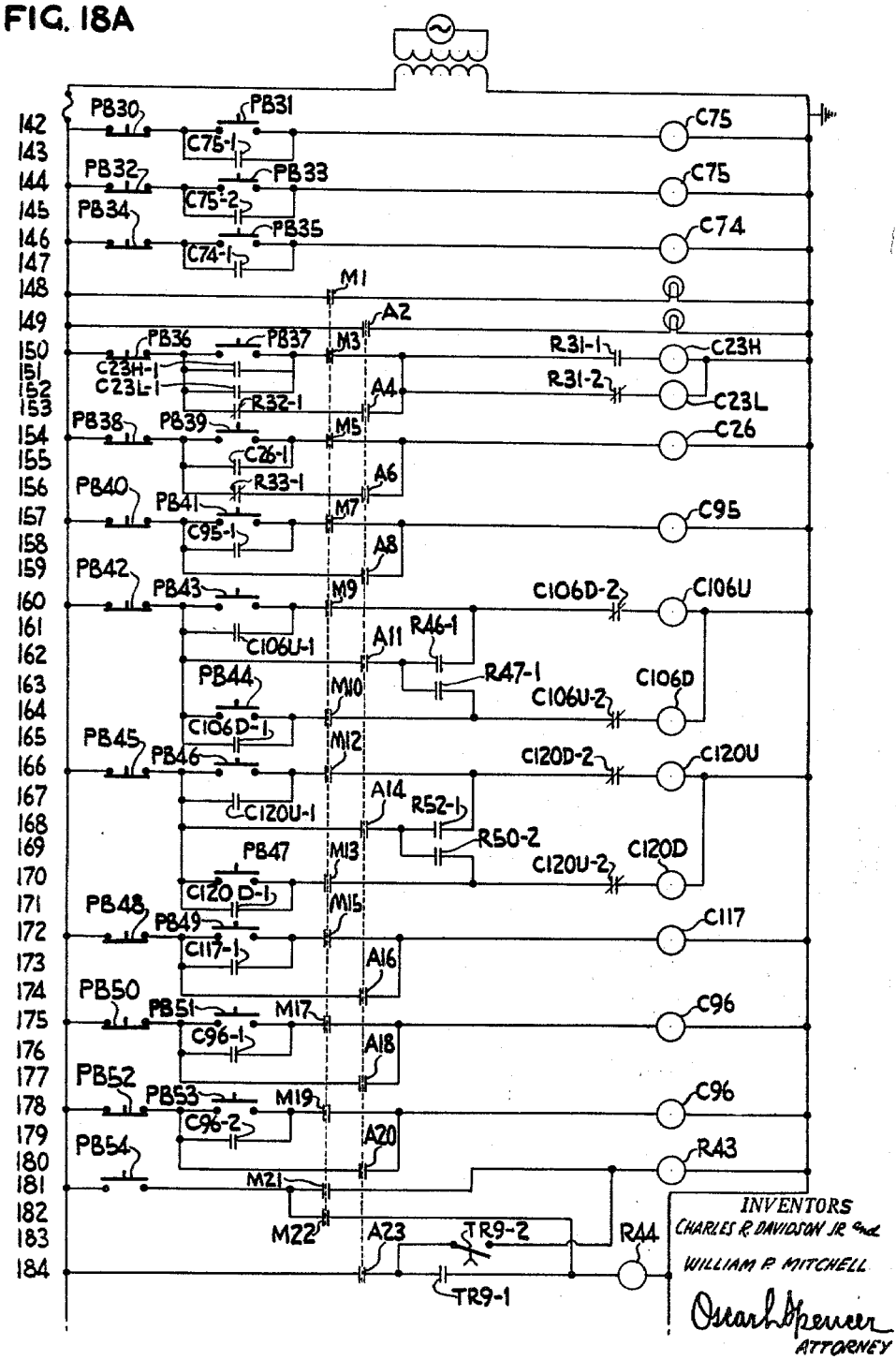
Figure 18C:
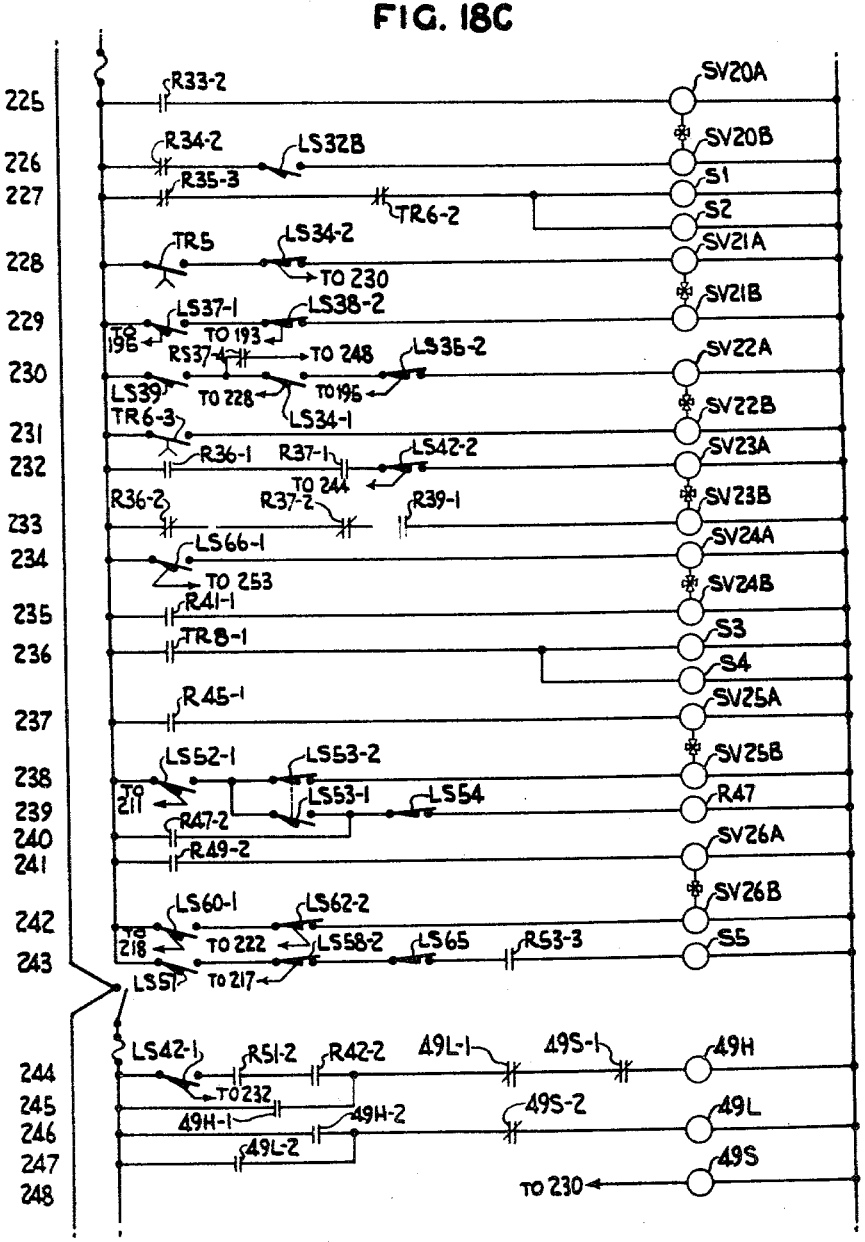

The carriage conveyor CC continues in a conveyor run-out section 78 driven by a run-out motor 79 (FIGURES 2 and 16). The conveyor run-out section extends through the quenching station 71, an unloading station 80, and ends at a carriage transfer station 81 at which the carriages C are removed from the terminal portion 82 of carriage conveyor CC. The control circuitry insures that each carriage C is moved into proper registry with a peg conveyor 83 located below the area where the carriage conveyor passes between support posts 84, which are secured to the apparatus supporting structure.

Referring especially to FIGURES 2, 12, and 13, extension arms 20 are constructed and arranged for alignment with a pair of lifting arms 85, each interconnecting levers 86 actuated by solenoids S3 and S4 to pivot relative to support posts 84 so that the lifting arms 85 move in substantially vertical paths flanking the vertical plane intersecting carriage conveyor CC into an upward position to lift extension arms 20 and cause tongs T to release their grip on the glass sheets. Springs 87 normally urge the levers 86 to pivot downwardly in spaced relation below extension arms 20 to provide clearance for an incoming glass laden carriage C, and also to permit the carriage C after unloading its glass sheet to continue along the terminal portion 82 of carriage conveyor CC to a carriage lifting station 81 (FIGURES 2, 14, and 15), where the carriages are lifted to a carriage return conveyor RC, which returns the carriages to the loading station 31 by way of a carriage lowering elevator 92 (FIGURE 1) and carriage conveyor CC.

Peg conveyor 83 (FIGURES 2, 12, and 13) extends transversely and obliquely downwardly from the unloading station 81 toward a packaging station (not shown) and comprises a sprocket wheel 93 driven through a peg conveyor clutch 94 by a peg conveyor drive motor 95. One or more cooling fan units 96 overlie the peg conveyor 83, and a peg conveyor brake 97 is included to limit the movement of the peg conveyor 83. Pegs 98 are arranged in sets of three pegs, each set being aligned parallel to the sprocket wheel axis and the length of the carriage conveyor CC. Each set of pegs 98 is spaced sufficiently from its adjacent set to form a groove 99 to permit a glass sheet released by lifting levers 85 contacting horizontal extension arms 20 of tongs T to drop between adjacent sets of pegs.

Bumpers 88 have a length sufficient to transverse two slats 89 of the peg conveyor, but are attached at one end only to provide support for the bottom edge of a glass sheet G deposited on the peg conveyor 83.

A screw jack 91 is pivotally mounted on one end of the peg conveyor 83 to adjust the height of the latter at its glass receiving end at unloading station 80 to accommodate for different sizes of glass sheets and to enable the apparatus to minimize the distance the glass sheet traverses as it falls freely from the tongs.

The cooling fan units 96 blow cooling air onto the surfaces of the glass sheets, thereby making it possible for personnel at the end of the peg conveyor 83 to remove glass sheets therefrom and package them.

Limit switch LS48 is located along carriage conveyor CC for actuation by a carriage C and limit switch LS49 along peg conveyor 83 for actuation by fingers 93A of a cam disc 93B rotatable with sprocket wheel 93. Circuits actuated by these limit switches insure that the movement of the peg conveyor 83 is correlated with that of carriages C along carriage conveyor CC.

The carriage lifting station 81 (FIGURES 2, 14, and 15) comprises a piston cylinder 100 pivotally supported at its bottom on a rigid support structure and containing a piston rod 101 secured at its upper end to a horizontal bar 102 forming part of a cradle 103 pivoted to cradle pivot supports 104. A gear 105 is driven through gearing by a carriage transfer motor 106.

The cradle 103 includes a pair of arms 107 of equal length pivotally attached at their upper ends with respect to gear 105 through a gear shaft 108 and pivotally connected at their free ends to connecting lugs 109. Another pair of arms 110 having a length equal to that of arms 107 is pivotally attached to a shaft 111 cradles relative to the gear shaft 108. The free end of each arm 110 is also pivoted to a connecting lug 109. The latter extend outwardly to form fingers which move in paths in vertical planes between the conveyor rolls 64 in the carriage lifting station 81. A free running roller 109A is mounted on a bifurcated extension at the outer end of each lug 109.

A torsion spring 112 is mounted to surround shaft 108 and is constructed and arranged to react against downward motion of each arm 110. This prevents arms 110 from crossing relative to arms 107 and locking the system of arms 107 and 110 and their lugs 109 during their downward rotational movement.

Movement of piston rod 101 causes the entire cradle 103 carrying the carriage transfer motor 106, gear 105 and arms 107 and 110 to pivot about an axis defined by the cradle pivot supports 104. Carriage transfer motor 106 rotates gear 105 about gear shaft 108 to rotate arms 107 and 110 about their respective pivots. By correlating the movements of piston rod 101 with operation of the carriage transfer motor 106 and the position of carriage C along carriage conveyor CC and carriage return conveyor RC, carriages are removed fom the terminal portion 82 of carriage conveyor CC and deposited on the carriage return conveyor RC at carriage lifting station 81.

Limit switches LS50, LS51, LS52, LS53, LS54, LS55, LS56, and LS64 are located at the carriage lifting station 81 to insure a proper sequence of operations of the various carriage transfer elements. The cooperation of these limit switches will be discussed in detail below in connection with the electrical control system. However, for understanding the construction, the location of these carriage lifting station limit switches will be described.

Limit switches LS50 and LS64 are located along the terminal portion 82 of carriage conveyor CC for actuation by a carriage C. Limit switches LS51 and LS53 are located for actuation by an actuating dog 51A fixed to cradle 103 as the latter moves during the transfer of a carriage C from carriage conveyor CC and carriage return conveyor RC. Limit switches LS52 and LS54 are fixed to cradle 103 in position for actuation by a dog 105A fixed to gear 105. Limit switch LS55 is located on the carriage return conveyor RC and positioned for actuation when a carriage C is deposited thereon. Limit switch LS56 is located along carriage return conveyor RC for actuation by a carriage C passing therealong.

To complete the present general discussion, cradle 103 is so constructed and arranged that the rollers 109A of lugs 109 occupy position *a* slightly below the plane of support at terminal portion 82 of carriage conveyor CC to receive a carriage C. Rollers 109A move to position *b* when piston rod 101 is extended, thereby lifting the carriage C off the terminal portion 82 of the carriage conveyor CC in an upward arc *a–b*. Then, carriage transfer motor 106 rotates gear 105 in such a direction that the rollers 109A lift the carriage upwardly to position *c* in an upward arcuate path *b–c* to a position slightly above the initial portion 113 of carriage return conveyor RC, which serves as the return run of carriage conveyor CC. Retraction of piston rod 101 moves rollers 109A from position *c* to position *d* in downward arcuate path *c–d*. During this latter downward movement, the upper portion 67 of the carriage C is deposited on the rolls of the initial portion 113 of carriage return conveyor RC.

The carriage return conveyor RC is directly overhead of the carriage conveyor CC and includes the initial portion 113 located at the carriage lifting station and driven by a clutch drive 114. A retractable carriage stop 115 is located immediately before the terminal portion 116 of carriage return conveyor RC to contact lug 67' whenever it is necessary to stop carriage movement onto carriage lowering station 92. Terminal portion 116 is located at the upper portion of the carriage lowering station 92 where the carriages are transferred from the carriage return conveyor RC to the carriage conveyor CC. Motor 117 drives carriage return conveyor RC and, in addition, its initial portion 113 through clutch 114 and its terminal portion 116 through a terminal portion clutch 118. Limit switches LS57, LC58, and LS65 are located either immediately prior to or at the terminal portion 116 of carriage return conveyor RC for actuation by carriages C to control movement of carriages into the carriage lowering station 92.

The carriage lowering station 92 comprises a mechanism similar to the mechanism provided at the carriage lifting section 81, except that the sequence of steps followed during the carriage lowering operation causes the carriage support fingers to follow a cycle of arcuate movements that is the reverse of the cycle followed by rollers 109A at the carriage lifting station. At the carriage lowering station 92 a cradle 119 is located. This cradle is similar in structure to that of cradle 103 at the carriage lifting station 81.

The sequence of positions occupied in a plane normal to the paths of movement of carriage conveyor CC and carriage return conveyor RC is *d–c–b–a–d*, etc. at the carriage lowering station.

Limit switches LS59, LS60, LS61, and LS62 are located for actuation by structural elements of cradle 119 that returns a carriage C back into the portion of carriage conveyor CC at loading station 31 ready to receive some more flat glass for another cycle of operations. Limit switch LS63 is located for actuation by a carriage C being deposited onto carriage conveyor CC, where the carriage is again brought into the section controlled by limit switches LS40, LC39, and LS43, and the carriage is ready to resume another cycle.

*Carriage drive and return drive system*

Referring to FIGURES 16 and 17, the various drives for the carriage conveyor CC and carriage return conveyor RC will now be described.

Motor 53 which drives the furnace section 52 of carriage conveyor CC operates continuously through chain drive 65. It also continuously operates cam limit switches CL1 and CL2 of positive instrument variable unit through a chain drive 121.

Run-out section drive motor 79 drives the leading shaft 122 of carriage conveyor CC through a chain drive 123. Another chain drive 124 connects the remaining stub rolls of the terminal portion 82 of carriage conveyor CC to the leading shaft 122. Overrunning clutch 66 couples chain drive 124 into chain drive 65 and causes the latter chain drive to operate at the velocity of chain drive 124 whenever the latter is actuated to a higher velocity than that normally attained by furnace conveyor section 52 controlled by motor 53.

Motor 53 drives shaft 125 through chain drive 135. Shaft 125 drives other stub rolls through chain drive 126 and also drives chain drive 127 which is coupled through an overriding clutch 128 to chain drive 65.

Motor 49 which controls the run-in section 48 of carriage conveyor CC operates shaft 129 through chain drive 130. The other rolls of conveyor section 48 are driven by shaft 129 through chain drive 131. An overrunning clutch 132 similar to clutch 66 is driven through shaft 129 by means of chain drive 133. Another overrunning clutch 134 interconnects chain drive 126 driven by motor 53 with a chain drive driven by motor 49.

The overrunning clutches 66, 128, 132, and 134 are so constructed and arranged that the motors 49 and 79 control the speed of the carriage conveyor CC whenever they are imparting a velocity thereto in excess of the constant velocity provided by constantly running motor 53.

Motor 117, which operates continuously, actuates the carriage return conveyor RC through drive shaft 137 and chain drive 138. Clutch 114 is driven through drive shaft 139 and chain drives 138 and 140 and, in turn, drives rollers 90 of the initial portion 113 of carriage return conveyor RC through chain drives 141 and 142 and shaft 143. In a similar manner, clutch 118 is driven by motor 117 through a reducer R and chain drives and drive shafts similar to those connecting the carriage return conveyor drive motor 117 to the clutch 114. In turn, clutch 118 operates the conveyor rolls 90' at the terminal portion 116 of carriage return conveyor RC through chain drives and drive shafts similarly arranged to those causing clutch 114 to operate carriage return conveyor rolls 90 at initial carriage return conveyor portion 113.

The cradle structure 103 transfers carriages from the carriage conveyor CC to the return conveyor RC, while the cradle structure 119 returns the carriages from the carriage return conveyor RC to the carriage conveyor CC.

*Control circuitry and operation of apparatus*

A glass sheet traveling along loading conveyor LC closes normally open limit switch LS28. If the position immediately ahead of the glass sheet is vacant, limit switch LS27 remains open and nothing happens to circuit 185 containing relay R31. However, when a glass sheet occupies the position of limit switch LS27 along loading conveyor LC and limit switch LS28 is closed, relay R31 of circuit 185 is energized, since normally open contact LS27–1 of limit switch LS27 is closed in circuit 185.

Simultaneously, normally closed contact LS27–2 of limit switch LS27 is opened in circuit 186. This reversal of contacts for limit switch LS27 causes a normally open contact R31–1 of relay R31 (circuit 150) which controls the high speed starter coil C23H of loading conveyor motor 23 to close and a normally closed contact R31–2 of relay R31 (circuit 151) which controls the low speed starter coil C23L of loading conveyor motor 23 to open. Thus, loading conveyor LC conveys the glass sheet at a high speed onto the pivotable conveyor section PC until the glass sheet trailing edge moves beyond limit switch LS28. This deenergizes relay R31 in circuit 185, thus permitting normally closed relay contact R31–2 in circuit 152 to close. This causes the low speed starter coil C23L of motor 23 to take over, thereby running loading conveyor LC at normal speed.

Speed of loading conveyor LC may also be controlled by closing normally open push button switch PB37 in circuit 150. Also, loading conveyor LC may be stopped altogether by opening normally closed push button switch PB36 which deenergizes motor 23 through circuits 150 through 153.

Pivotable conveyor section PC is inclined at 15 degrees from the vertical to receive the glass sheet coming off loading conveyor LC. Therefore, the glass sheet is urged to contact normally open limit switch LS29 in circuit 188, which closes, thus energizing relay R33, either through circuit 188 or circuit 189.

Relay R33 controls three contacts, R33–1, R33–2 and R33–3. Relay contact R33–1 (circuit 156) is normally closed, but opens when relay R33 is energized, thus stopping drive motor 26 for pivotable conveyor section PC. At the same time, normally open relay contact R33–2 (circuit 225) energizes solenoid valve SV20A which causes piston 28 to extend to pivot pivotable conveyor section PC from its oblique orientation in alignment with loading conveyor LC to a position in a vertical plane. The third contact R33–3, which is normally open, closes, preparing circuit 186 to respond to actuation of relay R32. The latter opens normally closed relay contact R32–1 (circuit 153) to cause loading conveyor LC to stop until pivotable conveyor section PC is clear of the preceding glass sheet.

Drive motor 26 for pivotable conveyor section PC is also controlled by a push button switch PB38 that is normally closed. PB38 controls the current flow through three parallel branches, one containing normally closed relay contactor R33–1 and an automatically gang operated switch A6, and two additional parallel branches in series with a ganged manual control switch M5, one additional branch (circuit 154) containing normally open push button switch PB39 and the other branch (circuit 155) containing starter coil contact C26–1 for pivotable conveyor section motor coil C26.

Limit switch LS30 is located adjacent limit switch LS29 and is actuated simultaneously with limit switch LS29. Thus, when a glass sheet passes limit switch LS30, it causes normally open limit switch LS30 to close, thereby actuating relay R34 through circuit 190.

Relay R34 controls normally open relay contact R34–1 in circuit 187 which is closed to prepare circuit 187 for closing of relay contact R32–1 to actuate relay R32. Relay R34 also opens normally closed relay contact R34–2 in circuit 226, and thus assures that the circuit controlling solenoid valve SV20B is inoperative to retract piston 28 which tilts pivotable conveyor section PC from its vertical orientation to its slanted orientation while a glass sheet is moving from pivotable conveyor section PC to downwardly slanted conveyor section DC.

Normally open limit switch LS31 in circuit 191 is in parallel with normally open limit switch LS30 in circuit 190. Thus, relay R34 is energized by a glass sheet contacting either limit switch LS30 or LS31 or both. Limit switch LS31 is located at the end of the pivotable conveyor section PC at a distance beyond limit switch LS30 less than the length of a glass sheet G to insure that relay contact R34–2 is kept open until the glass sheet leaves the pivotable conveyor section PC entirely, at which time both limit switches LS30 and LS31 are in their normally open position, thus deenergizing relay R34.

When the size of glass sheets handled is to be changed, the position of limit switch LS31 should be changed. Therefore, the position of limit switch LS31 should be adjustable to enable the apparatus to be flexible in the size of materials it handles.

When pivotable conveyor section PC starts pivoting into the vertical position, it actuates to close normally open limit switch LS32B in circuit 226. However, since the solenoid valve SV20B circuit also contains relay contact R34–2 which is maintained in the open position as long as a glass sheet contacts either limit switch LS30 or limit switch LS31 to keep relay R34 energized, solenoid valve SV20B does not operate to retract piston 28 to tilt the pivotable conveyor section PC from its vertical position until after the glass sheet G is removed therefrom.

When pivotable conveyor section PC reaches its vertical position, it causes normally closed limit switch LS32A to open in circuit 189 to deenergize relay R33 in circuit 188. Relay R33 controls normally closed relay contact R33–1 in circuit 156, which was open while relay R33 remained energized. Upon closing, relay contact R33–1 actuates motor coil C26 of drive motor 26 of pivotable conveyor section PC.

With pivotable conveyor section PC occupied, both limit switches LS30 and LS31 are open, thus deenergizing relay R34 through circuits 190 and 191. Relay contact R34–1 in circuit 187 resumes its normally open position, thus dropping out relay R32 in circuit 186 and acting as a holding circuit in case another glass sheet G has energized this latter circuit. At the same time relay contact R34–2 in line 226 resumes its normally closed position to energize solenoid valve SV20B to actuate pivotable conveyor section PC into its oblique position.

*Loading station controls*

When a glass sheet leaves pivotable conveyor section PC and enters the downwardly slanted conveyor section DC, it travels on the downwardly slanted conveyor section DC while supported between guide rolls 45 until it actuates limit switch LS33, which closes to energize latching relay R35L in circuit 192.

Latching relay R35L controls four contacts. Normally open relay contact R35–1 in circuit 188 closes when latching relay R35L is energized, thus preparing circuit 188 for actuating relay R33 when a glass sheet contacts and closes normally open limit switch LS29.

Normally closed relay contact R35-2 is opened in circuit 189.

Normally open relay contact R35-3 closes in circuit 227 to energize solenoids S-1 and S-2 which cause the gripper members 40 to move axially toward each other with the inboard portion of compound shafts 47 to clamp against opposite surfaces of the glass sheet G.

Normally open relay contact R35-4 closes, thus energizing timer relay TR5 in circuit 194. The timer relay TR5, which is normally open, closes to energize solenoid valve SV21A which retracts piston rod 36 to cause downward pivotal movement of the downwardly slanted conveyor section DC after a sufficient time delay determined by the timer relay TR to permit the gripper members 40 to clamp the glass sheet G securely.

It is necessary to pivot downwardly slanted conveyor section DC in order to provide clearance for the subsequent upward movement of the hoist structure 41 which carries the gripper members 40 and the glass sheet.

Upon reaching its lowermost position, downwardly slanted conveyor section DC actuates limit switch LS34. This latter actuation opens normally closed limit switch contact LS34-2 in circuit 228 to deenergize solenoid valve SV21A which operated to pivot downwardly slanted conveyor section DC.

At the same time, actuation of limit switch LS34 closes normally open limit switch contact LS34-1 preparing circuit 230 to actuate solenoid valve SV22A when normally open limit switch LS39 is contacted by a carriage C. This latter contact indicates that the carriage is in a position of proper alignment to receive a sheet of glass. Meanwhile, by closing limit switch LS39, circuit 248 is completed to stop coil 49S or motor 49.

Solenoid valve SV22A controls the extension of piston 46 which causes upward movement of hoist 41 along tracks 44. Movement of hoist 41 results in rotation of pinion gear 39 along rack 38 when actuated. Since the shafts 47 carrying gripper members 40 are splined to pinion gear 39 for axial movement relative to pinion gear 39, the gripper members 40 lift and rotate the glass sheets from the upper most position of downwardly slanted conveyor section DC into a position of predetermined orientation wherein the edge of the glass sheet formerly supported on downwardly slanted conveyor section DC becomes horizontally disposed as the upper edge of the glass sheet. Hood 50 makes contact with the bottom of rack 38, thus causing the racks 38 and pinion gears 39 to move upwardly without further rotation until the now upper horizontal glass sheet edge enters between and is gripped by tongs T. At this point, limit switch LS35 is actuated by rack 38.

Limit switch LS35 on actuation, opens normally closed limit switch contact LS35-2 in circuit 230 to deactivate solenoid valve SV22A, thereby stopping further extension of piston 46. This ends upward movement of the glass sheet. Actuation of limit switch LS35 also closes normally open limit switch contact LS35-1 in circuit 195 to energize timer relay TR6.

Timer relay TR6 controls three contacts. Contact TR6-1, which is normally open, closes circuit 196, which constitutes a holding circuit for timer relay TR6, thereby permitting circuit 196 to energize relay R36 when the hoist 41 descends a sufficient distance to operate limit switch LS36 on its downward movement following the step of loading a glass sheet onto the tongs T.

Another contact TR6-2, which is normally closed, opens on actuating timer relay TR6, thereby breaking circuit 227 to deenergize solenoids S1 and S2, thereby permitting the springs 42 to retract the gripper members 40 from their glass gripping position. At the same time, contact TR6-3, which normally keeps circuit 231 open, is caused to close after a predetermined time delay to energize solenoid valve SV22B, which retracts piston 46 to actuate the downward movement of the hoist 41.

As the empty hoist 41 descends, it operates limit switch LS36 to energize relay R36. Relay R36 closes normally open relay contact R36-1 in circuit 232 to prepare the furnace entrance door opening control circuit to actuate opening of the furnace door 54 when the downwardly moving hoist 41 is below the glass. It also opens normally closed relay contact R36-2 to deenergize solenoid valve SV23B in circuit 233 thus inhibiting the entrance door closing operation while the entrance door 54 is being opened through solenoid valve SV23A, and closes normally open relay contact R36-3 in circuit 197 to enable the latter to serve as a holding circuit for relay R36.

Hoist 41 continues to descend and at a predetermined time, cam limit switch CL1 which is continuously rotated by carriage conveyor motor 53, operates to energize relay R37 in circuit 199. Cam limit switch CL1 is contained within positive instrument variable unit 70 and is adjustable to control its cycle of operation to coincide with movement of carriage C. Thus, when different lengths of glass are to be tempered, requiring different lengths of carriage, cam limit switch CL1 is adjusted accordingly.

When relay R37 is actuated, the following contacts are affected:

(1) Relay contact R37-1, which is normally open, closes to actuate solenoid valve SV23A in circuit 232, thereby causing furnace entrance door 54 to open, since solenoid valve SV23A actuates its opening.

(2) Normally closed relay contact R37-2 opens to hold open circuit 233 which controls the closing of entrance door 54 by means of solenoid valve SV23B.

(3) Normally open relay contact R37-3 closes in circuit 198 to provide a holding circuit for relay R37 in circuit 199.

(4) Normally closed relay contact R37-4 in circuit 230 opens to actuate stop coil 49S in circuit 248 to stop motor 49, since stop coil 49S on actuation, opens both normally closed contacts 49S-1 in circuit 244 that controls high speed motor coil 49H and normally closed contact 49S-2 in circuit 246 that controls the low speed motor coil 49L.

Entrance door 54 contacts limit switch LS42 on opening, thus opening normally closed limit switch contact LS42-2 in circuit 232 to cut off power from solenoid valve SV23A, thus stopping further opening of entrance door 54. At the same time, limit switch contact LS42-1 closes to prepare circuit 244 to energize high speed motor coil 49H to close normally open contact 49H-1 in circuit 245 and to cause motor 49 to actuate conveyor section 48 to move a carriage rapidly into the furnace.

Meanwhile, exit door 55 closes limit switch LS44 in circuit 249 to energize high speed coil 79H of the run-out conveyor section motor 79 to move a carriage C through exit door 55 at a high speed. Coil 79H also closes normally open contact 79H-1 in circuit 250, which latter serves as a holding circuit.

A cam limit switch CL2 on power instrument variable unit 70 operates at the proper time to energize relay R42 in circuit 204 which closes normally open relay contact R42-1 in circuit 205, which thereby serves as a holding circuit for relay R42. The later relay also closes relay contact R42-2 in circuit 244 in series with high speed motor coil 49H to actuate the high speed coil 49H of the high speed motor 49 for the run-in carriage conveyor section 48. The high speed motor 49 continues to operate conveyor section 48 on its high speed coil 49H, thus moving the loaded carriage C therealong at a high speed until the carriage contacts limit switch LS43.

As long as carriage C is in contact with limit switch LS43, normally open limit switch contact LS43-1 in circuit 200 closes to energize relay R38 and normally closed limit switch contact LS43-2 in circuit 201 opens, deenergizing relay R39.

Relay R38 controls three relay contacts. When relay R38 is energized, the following occurs:

(1) Relay contact R38–1, which is normally open, closes to prepare circuit 193 for actuation of the unlatching coil R35U when limit switch contact LS38–1 is closed, thereby causing the gripper members 40 to release the glass sheet therebetween and permit it to hang freely from tongs T.

(2) Relay contact R38–2 in circuit 199, normally closed, is opened to deenergize relay R37.

(3) Normally open relay contact R38–3 in circuit 201 closes to provide a holding circuit for relay R38.

When the hoist 41 descends to the bottom of its travel, it operates limit switch LS37, thereby closing normally open limit switch contact LS37–1 in circuit 229 and energizing solenoid valve SV21B, which causes pivotable conveyor section PC to tilt into an oblique position aligned with loading conveyor LC. At the same time, limit switch contact LS37–2 in circuit 195 is opened, thereby deenergizing timer relay TR6.

When downwardly inclined conveyor section DC pivots upwardly, it actuates limit switch LS38, thus closing normally open limit switch contact LS38–1 in circuit 193 to energize the unlatching coil of relay R35U, which releases normally closed relay contact R35–3 in circuit 227, thereby deactivating solenoids S–1 and S–2 and permitting springs 42 to separate the gripper members 40 from gripping contact with the glass. At the same time, normally closed limit switch contact LS38–2 is opened, thereby deenergizing solenoid valve SV21B in circuit 229 and stopping further upward pivoting of conveyor section DC. At this time, downwardly slanted conveyor section DC is clear to receive another glass sheet from pivotable conveyor section PC and the gripper members 40 are spaced from each other a distance sufficient to permit the next glass sheet to enter therebetween.

*Furnace door controls*

When carriage C moves beyond limit switch LS43, its normally closed contact LS43–2 returns to its normally closed position to energize relay R39 in circuit 201. This latter relay controls three contacts in the following manner:

(1) Normally open relay contact R39–1 in circuit 233 closes to energize solenoid valve SV23B, which controls the closing of entrance door 54 of furnace 51.

(2) Normally open relay contact R39–2 in circuit 246 closes to actuate low speed motor coil 49L, which opens normally closed contact 49S–1 in circuit 244, thereby deactivating high speed motor motor coil 49H, and causes motor 49 for run-in conveyor section 48 of carriage conveyor CC to operate at a slower speed than formerly, as long as contact 49S–2 in circuit 246 is not opened by actuation of stop coil 49S. Low speed motor coil 49L also closes normally open contact 49L–2 in circuit 247 to enable the latter to behave as a holding circuit until stop coil contact 49S–2 is opened.

(3) Normally closed relay contact R39–3 opens circuit 204 to deenergize relay R42.

When entrance door 54 closes, limit switch LS41 resumes its normally open position, thereby deenergizing relay R38 in circuit 200. This opens the holding circuit for relay R39 through circuits 200 and 201 and their connecting wire W–1. Thus, relay contact R39–1 in circuit 233 resumes its normally open position and deactivates solenoid valve SV23B which controls the closing of entrance door 54 and stops further movement of the entrance door when it reaches the closed position.

The next carriage C in the succession of carriages moves into loading station 31 at slow speed and closes normally open limit switch LS39 in circuit 230, thus stopping motor 49 by actuating stop coil 49S in circuit 248 to open both normally closed contact 49S–1 in circuit 244, which deenergizes high speed coil 49H, and normally closed contact 49S–2 in circuit 246, which deactivates low speed coil 49L. By this time, carriage C has been picked up by the furnace conveyor section 52 of carriage conveyor CC and is driven by furnace conveyor section motor 53. The latter, as mentioned above, operates continuously at a predetermined speed less than that provided by high speed motor 49.

A carriage arriving at the outlet end of the furnace 51 actuates limit switch LS66, which operates two contacts as follows:

(1) Normally open limit switch contact LS66–1 closes to energize solenoid valve SV24A in circuit 234. Solenoid valve SV24A controls the opening of furnace exit door 55.

(2) Normally closed contact LS66–2 is opened, thereby opening circuit 253 and deactivating coil 79S of motor 79 which, when energized, stops operation of the run-out drive motor 79.

When exit door 55 is open completely, it closes normally open limit switch LS44 in circuit 249 to energize high speed motor coil 79H which operates run-out section drive motor 79 at high speed and also closes normally open contact 79H–1 in circuit 250 to provide a holding circuit for circuit 249.

When a carriage C reaches the open exit door 55, it operates limit switch LS45, which causes normally open contact LS45–1 in circuit 202 to close, thereby energizing relay R40. At the same time normally closed limit switch contact LS45–2 in circuit 203 opens to hold relay R41. Wire W–2 interconnects circuits 202 and 203 in such a manner that limit switch contacts LS45–1 and LS45–2 are in series with each other for reasons which will be understood better below.

When relay R40 is energized in circuit 202, it closes normally open relay contact R40–1 in circuit 203 by virtue of the interconnection provided by wire W–2.

When a carriage C leaves limit switch LS45 immediately beyond furnace 51, limit switch contact LS45–2 in circuit 203 resumes its normally closed position and relay R41 becomes energized through relay contact R40–1 and the now closed limit switch contact LS45–2 in circuit 203. Relay R40 remains actuated at this time through a holding circuit provided by relay contact R40–1, which is held closed through wire W–2 and normally closed limit switch LS47 as long as relay R40 remains actuated.

Relay R41 controls the closing of normally open relay contact R41–1 in circuit 235 to energize solenoid valve SV24B which causes the furnace exit door 55 to close and also controls normally open relay contact R41–2 in circuit 251 to energize low speed motor coil 79L, which opens normally closed contact 79L–1 in circuit 249 to deenergize high speed motor coil 79H and operate conveyor run-out section drive motor 79 at a low speed. Low speed motor coil 79L also closes normally open contact 79L–2 in circuit 252 so as to provide a holding circuit for circuit 251.

When exit door 55 is closed, normally closed limit switch 47 becomes opened and opens circuit 202 to relay R40, thereby deactivating relay contact R40–1 and opening circuit 203 to deenergize relay R41. The latter action energizes relay contact R41–1 to actuate the solenoid valve SV24B which causes exit door 55 to close.

*Quenching station controls*

When a carriage C reaches a position in alignment with the opposed apertured blow boxes 72 at quenching station 71, its leading edge actuates normally open limit switch LS46 which energizes stop relay 79S in circuit 253 to stop the conveyor run-out section drive motor 79 by opening contact 79S–1 thereby deactivating circuit 249 which controls high speed coil 79H and opening contact 79S–2 thereby deactivating circuit 251 which controls low speed coil 79L, thereby stopping the conveyor run-out section 78.

Circuit 253 also contains a normally closed contact 79H–2, which is actuated into the open position whenever high speed coil 79H is actuated. Thus, circuit 253 is prevented from stopping motor 79 whenever the motor is operating at high speed because of an open circuit whenever contact 79H–2 is open.

Compressor fans 75 and motor 74 which moves blow boxes 72 are continuously operated as long as the apparatus is in use. Circuits 142 and 143 control the operation of one of the compressor fans 75, while circuits 144 and 145 control the operation of the other compressor fan.

Circuit 142 contains normally closed push button contact PB30 in series with normally open push button PB31 and fan motor coil C75. Circuit 143 contains a normally open contact C75–1 that is actuated to serve as a holding circuit for circuit 142. Thus, when push button PB31 is closed momentarily, fan motor C75 in circuit 142 is operated continuously until push button PB30 is depressed.

Similarly, the other compressor fan 75 is controlled by circuit 144 containing normally closed push button PB32 in series with normally open push button PB33 and the other compressor fan motor coil C75. Circuit 145 contains a normally open contact C75–2 that is actuated to serve as a holding circuit for circuit 144.

Oscillator motor coil C74 for oscillator motor 74, which moves the opposed, interconnected blow boxes 72 in unison, is connected in series with normally closed push button PB34 and normally open push button PB35 in circuit 146. A holding circuit 147 is provided by normally open contact C74–1 which is actuated to closed by energizing circuit 146.

Push buttons PB32 and PB34 control the opening of circuits 144 and 146, respectively, in the manner that push button PB30 controls circuit 142. Similarly, push buttons PB33 and PB35 behave in circuits 144 and 146, respectively, in the manner that push button PB31 controls circuit 142.

Glass unloading station controls

When a later closing of exit door 55 actuates limit switch LS44 in response to a later carriage C leaving furnace 51, high speed motor coil 79H is again actuated through circuit 249 to move a carriage C over the peg conveyor 83, where it closes normally open limit switch LS48 in circuit 206, thus energizing timer relay TR7.

Timer relay TR7, when energized, closes timer relay contact TR7–1 in circuit 210 to energize relay R45 which controls operation of the piston 101 in a manner to be described later. Then, after a brief interval sufficient for stopping the motor 79 which controls the terminal portion 82 of carriage conveyor CC, timer relay contact TR7–2 closes in circuit 207 to energize timer relay TR8, which instantly closes normally open contact TR8–1 in circuit 236 to actuate solenoids S3 and S4, which actuate lifting levers 86 to raise lifting arms 85 simultaneously so that the latter lift extension arms 20, thereby loosening the grip on the glass sheet of tongs T. This allows the glass sheet to drop vertically onto peg conveyor 83 in a slot 99 between adjacent trios of pegs 98.

Timer-controlled contact TR8–2 in circuit 209 is caused to close after a predetermined time following actuation of timer relay TR8 while timer-controlled contact TR8–3 in series therewith is still closed.

The closing of both timer controlled contacts TR8–2 and TR8–3 energizes normally open timer relay TR9 in circuit 209. This causes relay TR9 to close normally open timer relay contact TR9–1 in circuit 184 immediately, thus energizing relay R44. Relay R44 energizes normally open relay contacts R44–1 and R44–2 in circuit 254, thereby energizing coil C97, which releases the peg conveyor brake 97.

After a time delay, time-controlled relay contact TR9–2 in circuit 183 closes to energize relay R43 in circuit 181. The latter relay R43 energizes normally open contacts R43–1 and R43–2 in circuit 255 to energize clutch coil C94 which energizes the peg conveyor clutch 94 to move the peg conveyor 83.

Peg conveyor controls

As soon as peg conveyor 83 starts moving, a tooth on sprocket wheel 93 loses contact with limit switch LS49 in circuit 208 and limit switch LS49 resumes its normally closed position. Timer controlled contact TR8–3 in circuit 209 is now opened, thus preparing circuit 208 to deenergize timer relay TR9 whenever limit switch LS49 is caused to open.

This latter event occurs when the peg conveyor 83 moves a distance equal to that separating sets of pegs 98 so that the next slot 99 between peg trios 98 is aligned directly beneath the position occupied by glass sheets in the unloading station 80.

At this time, limit switch LS49 is again contacted by the next tooth on sprocket wheel 93 so that limit switch LS49 moves into the open position, thus deenergizing timer relay TR9 through circuit 208. With timer relay TR9 deenergized, timer relay contact TR9–1 in circuit 184 is opened to deenergize relay R44, which deenergizes brake coil C97 in circuit 254 by permitting contacts R44–1 and R44–2 to resume their normally open position.

At this time timer controlled timer relay contact TR9–2 in circuit 183 opens to deenergize relay R43 in circuit 181. This action enables relay contacts R43–1 and R43–2 in circuit 255 to resume their normally open position, thus deenergizing clutch coil C94 and releasing peg conveyor clutch 94.

Peg conveyor 83 can be actuated manually by pressing push button PB54, thereby energizing relay R43 in circuit 181. As long as push button PB54 remains depressed, relay R43 maintains relay contacts R43–1 and R43–2 closed in circuit 255, thereby activating clutch coil C94 to maintain clutch 94 engaged with driving means driven by peg conveyor drive motor 95.

Peg conveyor drive motor 95 is also capable of manual operation through circuit 157 through normally closed push button PB40 by depressing normally open push button contact PB41. The coil C95 for peg conveyor drive motor 95 controls a normally open contact C95–1 in circuit 158, which serves as a holding circuit when contact C95–1 is actuated. Push button PB40 can be used to open circuit 157 manually to deenergize peg conveyor motor 95 through this circuit.

Since fans 96 are located above peg conveyor 83 to cool the glass sheets as the latter travel from the glass unloading station 80 to the packaging station, it is necessary that the fans blow continuously. Hence, simple circuitry is employed.

Circuit 175 comprises a normally closed switch PB50 in series with a normally open switch PB51 and the fan motor coil C96. A normally open contact C96–1 in circuit 176 is in parallel with switch PB51 and serves as a holding contact for the fan motor coil C96.

Circuits 178 and 179 are identical to circuits 175 and 176 and operate another fan motor coil C96 in circuit 175. In these latter circuits, PB52 corresponds to PB50, PB53 to PB51 and C96–2 corresponds to C96–1.

In order to operate the cooling fans 96, it is merely necessary to close push button switches PB51 in circuit 175 and PB53 in circuit 178 momentarily to actuate coils C96, which close holding contacts C96–1 in circuit 176 and C96–2 in circuit 179. In order to stop the cooling fan operation, push buttons PB50 in circuit 175 and PB52 in circuit 178 are actuated momentarily to open their respective circuits.

Carriage run-out and lifting station controls

At the proper time, run-out section drive motor 79, which controls carriage movement in the conveyor run-out section 78 and the terminal portion 82 of carriage conveyor CC, operates to move a carriage C to the carriage lifting station 81, where it contacts normally open limit switch LS50 to close the latter and energize relay R45 in circuit 210. This closes normally open relay contact R45–1 in circuit 237 which energizes solenoid valve SV25A which causes piston 101 to extend from piston cylinder 100, thus rotating arms 107 and 110 with cradle 103 about the axis formed by cradle pivot supports 104.

This rotation moves rollers 109A from a position *a* below carriage C to where they contact and lift the bottom of carriage superstructure 67 at position *b*.

Relay R45 also closes normally open contact R45–2 to prepare circuit 211 for energizing relay R46 whenever either limit switch contact LS51–1 in circuit 221 or relay contact R46–2 in circuit 212, both of which are normally open, are actuated into the closed position.

As the cradle 103 is rotated about the cradle pivot supports 104, an abutment 51A carried by the cradle actuates limit switch LS51 carried by the cradle support. This actuation closes normally open limit switch contact LS51–1, thereby actuating relay R46 in circuit 211 and opening normally closed limit switch contact LS51–2, which deactivates relay R45 in circuit 210 through wire W–3.

Relay R46, on actuation, causes normally open relay contact R46–1 to close circuit 162, thereby energizing a coil C106U in circuit 160 which causes motor 106 to rotate gear 105 and the lifting arms 107 and 110 in an upward arc.

Lifting arms 107 and 110 of the carriage lifting cradle 103 are constructed for movement in vertical planes that do not intersect rolls 63 of carriage conveyor CC. The rolls 90 of carriage return conveyor RC are constructed and arranged above rolls 63 of carriage conveyor CC so that the vertical plane of movement taken by the lifting arms does not abut conveyor rolls 63 or 90. Therefore, motor 106 causes carriages C to be lifted upwardly in an arcuate path so that rollers 109A move from position *b* slightly outwardly and upwardly from the terminal portion 82 of carriage conveyor CC to position *c* slightly above the initial portion 113 of carriage return conveyor RC. At the same time, relay R46 closes normally open relay contact R46–2 to enable circuit 162 to serve as a holding circuit for coil C106U in circuit 160.

Motor 106 continues to rotate gear 105 in an upward arc until limit switch LS52 is contacted, thus opening normally closed limit switch contact LS52–2 in circuit 211, which deactivates relay R46. This permits relay contact R46–1 in circuit 162 to resume its normaly open position and stop motor 106. Also, holding relay contact R46–2 in circuit 212 resumes its normally open position.

When limit switch LS52 is actuated, it also closes normally open limit switch contact LS52–1 in circuit 238, which actuates solenoid valve SV25B. The latter controls the retraction of piston 101, thereby causing the entire cradle assembly 103 to pivot about the cradle pivot supports 104 in a downward arc sufficient to deposit a carriage C on rolls 90 of the initial portion 113 of carriage return conveyor RC and to move rollers 109A from position *c* to position *d* or sufficiently below a position supporting carriage C on rolls 90 to permit the latter to move along the return conveyor RC toward carriage lowering station 92.

When solenoid valve SV25B retracts piston 101, cradle assembly 103 actuates limit switch LS53, which simultaneously opens normally closed limit switch contact LS53–2 in circuit 238 to deactivate solenoid valve SV25B. This stops further retraction of piston 101 and closes normally open limit switch contact LS53–1 in circuit 239 to actuate relay R47.

Relay R47, on actuation, closes normally open relay contacts R47–1 in circuit 163, R47–2 in circuit 240 and opens closed relay contact R47–3 in circuit 213.

Relay contact R47–1 energizes coil C106D in circuit 164, which causes motor 106 to rotate gear 105 and the arms 107 and 110 of cradle assembly 103 in such a direction as to lower rollers 109A back to position *a* in a position slightly below the support plane of carriage conveyor CC.

Relay contact R47–2 in circuit 240 serves as a holding contact for relay R47 in circuit 239 when actuated to the closed position.

Relay contact R47–3 in circuit 213 deactivates relay R48, which disengages clutch 114 which drives the rolls 90 of the initial portion 113 of carriage return conveyor RC until such time as the transfer cradle 103 and its appurtenant structure is clear of initial carriage return conveyor portion 113.

Both manual control and automatic controls are available for motor 106. A normally closed push button switch PB42 in circuit 160, when pushed, opens the circuits to coils C106U (circuit 160) and C106D (circuit 164), thereby deenergizing motor 106 from rotating in either direction.

Also coil C106U, on actuation, closes normally open contact C106U–1 in circuit 161 to provide a holding circuit and opens normally closed contact C106U–2 which is connected in series with coil C106D in circuit 164, thus insuring that when motor 106 is rotating in a finger lifting direction, it is not driven to rotate in the opposite direction simultaneously. Similarly, coil C106D in circuit 164 controls holding contact C106D–1 in circuit 165 and normally closed contact C106D–2 series connected with coil C106U in circuit 160 for the same reasons.

If, for some reason, it is desired to operate motor 106 manually, push button PB42 in circuit 160 is allowed to remain in its normally closed position and either push button PB43 is depressed to actuate coil C106U to cause motor 106 to raise rollers 109A in an upward arc or push button PB44 in circuit 164 is depressed to actuate coil C106D to cause motor 106 to lower rollers 109A in a downward arc.

When the carriage is deposited on initial portion 113 of carriage return conveyor RC, it closes normally open limit switch LS55 in circuit 213. This prepares circuit 213 to energize relay R48, closing normally open relay contacts R48–1 and R48–2 in circuit 256 to actuate coil C114 which energizes carriage return conveyor clutch 114 to remove the carriage from the carriage lifting station 81.

When the cradle 103 is rotated to its lowermost position, it actuates limit switch LS54 in circuit 239, thus deactivating relay R47 and permitting relay contact R47–3 to resume its normally closed position, thus actuating relay R48 in circuit 213 and activating a coil C114 which energizes carriage return conveyor clutch 114 in circuit 256 in the above-described manner.

As the carriage C moves along the carriage return conveyor RC, it closes normally open limit switch LS56 in circuit 214, which serves as a holding circuit for relay R48 as long as relay R47 remains deenergized and until the carriage clears the initial portion 113 of carriage return conveyor RC.

A normally open limit switch LS64 is located beyond the terminal portion 82 of carriage conveyor CC. Whenever a carriage moves beyond the carriage lifting station 81, it closes limit switch LS64 to actuate a warning circuit 224 that includes a horn and a light to alert operating personnel both visually and audibly of such an operational mishap. A switch PB55 is included in series with the horn to deactivate the latter once the warning is sounded.

*Carriage return conveyor*

The carriage continues along the carriage return conveyor RC back to the loading station 31 until it runs into another carriage which is held back pending clearance of the carriage lowering station 92.

A solenoid valve S5 in circuit 243 operates a carriage stop 115 which is engageable with lug 67' of carriage C at the portion of the carriage return conveyor immediately above loading station 31. Solenoid valve S5 must be energized to release the carriage stop 115 and clear the carriage return conveyor RC so that a carriage may move into its terminal portion 116. Thus, a carriage on its return run is restrained from moving into the terminal portion 116 of the carriage return conveyor RC unless all the series-connected contacts of circuit 243, LS57, LS58-2, LS65 and R53-1 are closed to energize solenoid valve S5 to release carriage stop 115 from engaging lug 67′ and permit carriage movement.

Since carriage stop 115 is located between limit switch LS57 and the terminal carriage return conveyor portion 116, a carriage engaged by carriage stop 115 also closes normally open limit switch LS57. If there is no carriage C occupying terminal portion 116 and the carriage lowering station 92 is not in a position to interfere with carriage movement along the terminal portion 116 of carriage return conveyor 91, when a carriage actuates limit switch LS57, solenoid valve S5 is energized in circuit 243 to retract carriage stop 115 to a position clearing lug 67′ of the carriage C, thereby permitting the carriage to pass into the terminal portion 116 and actuate normally closed limit switch LS65 into the open position. This opens circuit 243, deenergizing solenoid 85 and permitting carriage stop 115 to resume its lug engaging position.

The distance between carriage stop 115 and limit switch LS65 is at least equal to the length of a carriage so as permit carriage stop 115 to retard a subsequent carriage moving along the carriage return conveyor RC.

The carriage C that has contacted limit switch LS62 continues into the terminal portion 116, driven by clutch 118 and actuates limit switch LS58 to open normally closed limit switch contact LS58-2 in circuit 243, thus insuring that solenoid valve S5 remains deenergized. At the same time, by actuating limit switch LS58, normally open limit switch contact LS58-1 in circuit 217 is closed to actuate timer relay TR10.

Timer relay TR10 controls a delayed opening of normally closed contact TR10-1 in circuit 223 to deenergize relay R53. This causes relay contact R53-3 in circuit 243, which was closed, to resume its normally open condition so that solenoid valve S5 cannot be actuated to retract carriage stop 115. At the same time, this permits relay contacts R53-1 and R53-2 in circuit 257 to resume their normally open condition, thereby deenergizing clutch coil C118, which controls clutch 118.

Timer relay TR10 also causes a delayed closing of timer relay contact TR10-2 in circuit 215. The time interval for this delay is chosen so that relay contact TR10-2 is closed as soon as clutch coil C118 is deenergized to energize relay R49.

*Carriage lowering station controls*

Relay R49 closes normally open relay contact R49-1 in circuit 216 to serve as a holding circuit as long as relay R49 remains energized and also closes normally open relay contact R49-2 to energize solenoid valve SV26A in circuit 241, thus causing a piston similar to piston 101 at the carriage lifting station 81 to extend, thereby rotating cradle 119. This causes carriage support fingers identical to fingers 109 to move from a position equivalent to position *d* of FIGURE 14 to one equivalent to position *c*, thereby lifting the carriage off the terminal portion 116 of carriage return conveyor RC. When the fingers reach a position equivalent to position *c*, limit switch LS61 is actuated to open normally closed limit switch contact LS61-2 in circuit 215, thus deenergizing relay R49 and stopping further piston extension. At this time, normally open limit switch contact LS61-1 in circuit 218 is closed to energize relay R50.

Relay R50, on actuation, closes a holding contact R50-1 in circuit 219 and also closes a normally open relay contact R50-2 in circuit 169. The latter contact energizes coil C120D which actuates motor 120 to rotate the carriage support fingers from a position equivalent to position *c* to one equivalent to position *b*.

At the position equivalent to position *b*, limit switch LS60 is actuated, thus opening the normally closed limit switch contact LS60-2 in circuit 218. Relay R50 is deactivated and relay holding contact R50-1 in circuit 219 is thus opened. At the same time, normally open limit switch contact LS60-1 in cricuit 242 is closed to energize solenoid valve SV26B, which controls the retraction of the piston similar to piston 101, thus moving the carriage support fingers in a downward arc from a position equivalent to position *b* to one equivalent to position *a*, thus depositing the carriage on carriage conveyor CC at the carriage lowering station 92, and permitting sufficient clearance for the carriage to move along carriage conveyor CC to the loading station 31.

When the fingers occupy a position equivalent to that of position *a*, limit switch LS62 is operated. This opens normally closed limit switch contact LS62-2 in circuit 242 to deactivate solenoid valve SV26B to stop the piston retraction. This also closes normally open limit switch contact LS62-1 to prepare circuit 222 for actuating coil C120U of motor 120 to cause the latter to raise the fingers from a position equivalent to position *a* to one equivalent to position *d* when the carriage has cleared the carriage lowering station 92.

When the carriage C is deposited on the carriage conveyor CC at the carriage lowering station 92, normally open limit switch LS63 is closed. This energizes relay R51 through circuit 220. Relay R51 opens normally closed relay contact R51-1 in circuit 222 to deactivate relay R52 which actuates motor coil C120U in circuit 166. Relay R51 also closes relay contact R51-2 to prepare circuit 244 to actuate high speed coil 49H of carriage conveyor drive motor 49 whenever the circuit 244 is closed by operation of cam limit switch CL2 in circuit 204 to actuate relay R42 or by relay holding contact R42-1 and neither low speed coil 49L (circuit 246) nor motor stop coil 49S (circuit 248) is actuated.

The carriage C contacts normally open limit switch LS40 before it leaves limit switch LS63, thereby continuing to energize relay R51 through circuit 221 rather than circuit 220 until it passes beyond limit switch LS40. At this time relay R51 is deenergized and relay contact R51-1 in circuit 222 resumes its normally closed position to energize relay R52. The latter closes relay contact R52-1 in circuit 168 to actuate coil C120U of motor 120 in circuit 166, thus causing the carriage support fingers corresponding to fingers 109 to move upwardly in an arcuate path from a position corresponding to position *d* to one corresponding to position *a*.

Coil C120U also closes contact C120U-1 in circuit 167 to enable the latter to serve as a holding contact when closed, and opens contact C120U-2 in circuit 170 to avoid actuating motor coil C120D whenever coil C120U is energized.

It should also be mentioned in passing at this time that coil C120D in circuit 170 controls the operation of a coil contact C120D-1 in circuit 171 which serves as a holding contact when energized and also opens contact C120D-2 in circuit 166 to avoid actuating coil C120U whenever coil C120D is energized.

The coils C120U and C120D of motor 120 may also be controlled by push button switches. Normally closed push button switch PB45 in circuit 166 serves as a master switch for both motor coils C120U and C120D (circuit 170), while normally open push button switches PB46 and PB47 are connected in series with their associated motor coils C120U and C120D, respectively, in their respective circuits 166 and 170. Contact C120U-1 in circuit 167 bypasses PB46, while contact C120D-1 in circuit 171 bypasses PB47.

When relay R52 is energized, it also opens normally closed relay contact R52-2 in circuit 223 to prevent untimely actuation of relay R53, thereby preventing clutch 118 from operating terminal portion 116 of carriage return conveyor RC until the fingers have been raised to a position equivalent to that of position *d* at the carriage lifting station 81.

When the fingers reach the latter position, limit switch LS59 in actuated to close normally open limit switch contact LS59–1 in circuit 223 and to open normally closed limit switch contact LS59–2 in circuit 222. Thus, relay R52 in circuit 222 is deenergized and relay R53 activated through circuit 223.

Relay R53 closes normally open relay contact R53–3 in circuit 243 to energize solenoid valve S5 which retracts carriage stop 115 and permits a carriage to move along the carriage return conveyor RC into its terminal portion 116. At the same time, relay contacts R53–1 and R53–2 are closed in circuit 257 to energize coil C118 of the driving clutch 118 for the terminal carriage return conveyor portion 116.

The controls are in condition to repeat the cycle described above.

Gang controls

In addition to the individual manual controls provided as a safety feature in the various individual circuits by means of the push button switches described above, a number of mechanically ganged switches are manually controlled from a master manual switch M1 in circuit 148 and another set of mechanically ganged switches are automatically controlled from a master automatic switch in circuit 149. The following table summarizes the control provided by each of the ganged switches. In each case the letter M denotes a manually controlled switch and the letter A an automatically controlled switch.

| Switch | Circuit | Operation Controlled |
|---|---|---|
| M3 | 150 | }Loading conveyor motor 23. |
| A4 | 153 | |
| M5 | 154 | }Pivotable conveyor section drive motor 26. |
| A6 | 156 | |
| M7 | 157 | }Peg conveyor drive motor 95. |
| A8 | 159 | |
| M9 | 160 | Coil C106U of carriage lifting motor 106. |
| M10 | 164 | Coil C106D of carriage lifting motor 106. |
| A11 | 162 | Carriage lifting motor 106. |
| M12 | 166 | Coil C120D of carriage lowering motor 120. |
| M13 | 170 | Do. |
| A14 | 168 | Carriage lowering motor 120. |
| M15 | 172 | }Motor 117 of carriage return conveyor 91. |
| A16 | 174 | |
| M17 | 175 | |
| A18 | 177 | }Motors for cooling fans 96 above peg conveyor 83. |
| M19 | 178 | |
| A20 | 180 | |
| M21 | 181 | Peg conveyor clutch 94. |
| M22 | 182 | Peg conveyor brake 97. |
| A23 | 184 | Peg conveyor clutch 94 and brake 97. |

While the above description has illustrated a typical embodiment capable of automatically conveying glass sheets into alignment with glass sheet gripping tongs, bringing the glass sheets into gripping engagement by the tongs, moving the tongs-supported glass sheets through a hot atmosphere and then through a chilling atmosphere, unloading the treated glass sheets and returning the tongs in a cyclic path to a position where they grip additional glass sheets, it is understood that the principles of the present invention are capable of use in other treatments of glass besides tempering, such as coating glass surface with or without prior heating. Furthermore, the aspects of the present invention relating to automatic loading and unloading are also susceptible of use in handling articles of rigid sheet material other than glass with a considerable savings in labor cost resulting. In other words, the present invention involves handling and transferring rigid sheet material and is especially suitable, thought not limited, to the automatic handling of glass sheets for tempering.

The present invention is also susceptible of use in handling rigid sheets for dipping, coating, passing through vats, and other containers holding materials suitable for treating rigid sheets for pickling, cleaning, washing, drying, painting, annealing and other uses that will become apparent in the light of the present disclosure. Also, it is possible that the various treatments for rigid sheets of glass and other materials may be conducted in an atmosphere other than a container and having the necessary pressure, temperature and other controls required for such treatment.

This application is a division of application Serial No. 806,956, filed April 16, 1959, for handling rigid sheet articles.

What is claimed is:

1. Apparatus for loading rigid sheets into tongs comprising:
    a first conveyor including:
        a loading conveyor section constructed and arranged for conveying flat rigid sheets in a tilted position,
        a pivotable conveyor section located in end-to-end relation to said loading conveyor section and pivotable between a tilted orientation aligned with said loading conveyor section to receive rigid sheets therefrom and a vertical plane,
    means operatively connected to said pivotable conveyor section to pivot the latter into a position supporting a rigid sheet in said vertical plane,
    and
    a rigid sheet receiving station located in alignment with said pivotable conveyor section when the latter occupies said position supporting a rigid sheet in said vertical plane,
    second conveyor means for conveying a tong supporting carriage in a cyclic path including a longitudinal path portion disposed above said rigid sheet receiving station and adapted to support tongs in said verical plane occupied by said sheet receiving station,
    and
    transfer means responsive to the presence of a glass sheet at said sheet receiving station and a tong supporting carriage in alignment thereabove for lifting said rigid sheet occupying said sheet receiving station from said sheet receiving station and into gripping relation by said tongs.

2. Apparatus as in claim 1, wherein said transfer means comprises:
    a pair of gripper members for gripping a rigid sheet therebetween
    a pair of axially aligned shafts supporting said gripper members in opposed relation to one another and constructed and arranged for equal and opposite axial movement with respect to each other,
    shaft support means movable between a first position adjacent said sheet receiving station and a second position adjacent said second conveyor means and constructed and arranged to permit the shafts to rotate in unison into a predetermined orientation while moving toward said second conveyor means, and
    means actuating said shaft support means for movement between said first position and said second position.

3. Apparatus as in claim 2, further comprising:
    control means permitting a rigid sheet to enter said sheet receiving station when said shaft support means is in said first position, said control means being responsive to the presence of a rigid sheet at said sheet receiving station to urge said gripper members toward each other in gripping relation to said article and thereafter cause said actuating means to move said shaft support means to said second position when a tong supporting carriage occupies said longitudinal path portion, thereby urging said rigid sheet into gripping relation by said tongs, to urge said gripper members away from each other after the tongs grip said rigid sheet, to return said shaft support means to said first position and to prevent movement of a succeeding rigid sheet onto said sheet receiving station until after said shaft support means occupies said first position.

4. Apparatus as in claim 2,
said shaft support means comprising:
a pinion gear fixed to each of said axially aligned shafts and
a hook extending downwardly from said shaft support means;
a pair of vertical columns defining a path of movement for said shaft support means;
a stop on each said vertical column;
a rack slidably supported on each said vertical column so that its bottom edge rests on said stop in its lowermost position;
said hook means being constructed and arranged so that a portion thereof engages the bottom of the racks when the pinion gear has rotated into a predetermined orientation.

5. Apparatus for loading rigid sheet material, comprising:
a pair of gripper members for gripping a rigid sheet therebetween,
a pair of axially aligned shafts constructed and arranged to support each said gripper members in opposed relation to each other for equal and opposite axial movement with respect to each other,
shaft support means movable between a first position and a second position and constructed and arranged to permit the shafts to rotate in unison into a predetermined orientation and then maintain the shafts in said predetermined orientation while continuing to move toward said second position, and
means actuating said shaft support means for movement between said first position and said second position.

6. Apparatus as in claim 5, further including:
control means permitting a rigid sheet to enter said loading apparatus between said gripper members when said shaft support means occupies said first position,
said control means responsive to the present of said rigid sheet at said loading station to urge said gripper members toward each other in gripping relation to said article and thereafter cause said actuating means to move said shaft support means toward said second position to transfer said rigid sheet to said second position,
to urge said gripper members away from each other when the rigid sheet is received at said second position and to return said shaft support means toward said first position, and
preventing movement of a succeeding rigid sheet into the loading station until said shaft support means occupies said first position.

7. Apparatus as in claim 5,
said shaft support means comprising
a pinion gear fixed to each of said axially aligned shafts and
a hook extending downwardly from said shaft support means;
a pair of vertical columns defining a path of movement for said shaft support means;
a stop on each said vertical column;
a rack slidably supported on each said vertical column so that its bottom edge rests on said stop in its lowermost position;
said pinion gear having teeth engaging said rack for movement therealong;
said hook means being constructed and arranged so that a portion thereof engages the bottom of the racks when the pinion gear has rotated into a predetermined orientation during its movement along said rack, whereby further upward movement of said shaft support means results in upward movement of said pinion gear maintained at said predetermined orientation.

8. Apparatus as in claim 3, wherein said pivotable conveyor section is pivotable through an acute angle about an axis parallel to the length of said first conveyor.

9. Apparatus for conveying rigid sheets along an essentially straight line of travel comprising: an elongated conveyor including a loading conveyor section constructed and arranged for conveying flat rigid sheets in a tilted position, a pivotable conveyor section located in end-to-end relation to said loading conveyor section and pivotable through an acute angle about an axis parallel to the length of said conveyor between a tilted orientation aligned with said loading conveyor section to receive rigid sheets therefrom and a vertical orientation, means operatively connected to said pivotable conveyor section to pivot the latter through said acute angle about said axis parallel to the length of said conveyor into a position supporting a rigid sheet in said vertical plane, a rigid sheet receiving station located in alignment with said pivotable conveyor section when the latter occupies said position supporting a rigid sheet in said vertical plane, further including control means preventing movement of a rigid sheet from said loading conveyor section onto the pivotable conveyor section except when said pivotable conveyor section is in its tilted orientation and clear of a rigid sheet and additional control means preventing movement of a rigid sheet from said pivotable conveyor section into said rigid sheet receiving section except when said pivotable conveyor section is oriented in said vertical plane and the rigid sheet receiving section is clear of a rigid sheet, and means for engaging the major surface of said rigid sheet for maintaining said rigid sheet in said vertical plane while in said rigid sheet receiving station.

References Cited in the file of this patent
UNITED STATES PATENTS

| | | |
|---|---|---|
| 1,476,050 | Buttress | Dec. 4, 1923 |
| 1,657,680 | Lorenz | Jan. 31, 1928 |
| 1,970,749 | Heichert | Aug. 21, 1934 |
| 2,596,228 | Fletcher | May 13, 1952 |
| 2,702,135 | Knapp | Feb. 15, 1955 |
| 2,779,490 | Clarke | Jan. 29, 1957 |
| 2,872,057 | Wagner | Feb. 3, 1959 |